United States Patent
Lin et al.

(10) Patent No.: US 9,326,250 B2
(45) Date of Patent: Apr. 26, 2016

(54) METHOD AND DEVICE FOR REDUCING TRANSMISSION POWER OF UPLINK SIGNAL

(75) Inventors: Zhirong Lin, Shenzhen (CN); Bo Dai, Shenzhen (CN); Bin Yu, Shenzhen (CN); Lu Ren, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 241 days.

(21) Appl. No.: 14/240,896

(22) PCT Filed: Jun. 6, 2012

(86) PCT No.: PCT/CN2012/076535
§ 371 (c)(1),
(2), (4) Date: Apr. 16, 2014

(87) PCT Pub. No.: WO2012/167727
PCT Pub. Date: Dec. 13, 2012

(65) Prior Publication Data
US 2014/0219203 A1 Aug. 7, 2014

(30) Foreign Application Priority Data
Jun. 8, 2011 (CN) .......................... 2011 1 0152499

(51) Int. Cl.
H04L 1/00 (2006.01)
H04W 52/14 (2009.01)
H04L 5/00 (2006.01)
H04W 52/34 (2009.01)

(52) U.S. Cl.
CPC ........... *H04W 52/146* (2013.01); *H04L 5/0042* (2013.01); *H04W 52/34* (2013.01); *Y02B 60/50* (2013.01)

(58) Field of Classification Search
CPC ..... H04W 52/02; H04W 52/03; H04W 52/04; H04B 7/2123; H04B 7/2124; H04L 47/10; H04L 47/11; H04L 47/12; H04L 47/13; H04L 47/14

USPC .................. 370/229, 230, 235, 311, 322, 329
See application file for complete search history.

(56) References Cited

U.S. PATENT DOCUMENTS

2011/0116480 A1    5/2011   Li et al.
2013/0215849 A1*   8/2013   Heo ..................... H04W 52/365
                                                              370/329

FOREIGN PATENT DOCUMENTS

CN    1728586 A    2/2006
CN    1917393 A    2/2007

OTHER PUBLICATIONS

International Search Report in international application No. PCT/CN2012/076535, mailed on Sep. 13, 2012.
English Translation of the Written Opinion of the International Search Authority in international application No. PCT/CN2012/076535, mailed on Sep. 13, 2012.

* cited by examiner

*Primary Examiner* — Dady Chery
(74) *Attorney, Agent, or Firm* — Oppedahl Patent Law Firm LLC

(57) ABSTRACT

The present disclosure provides a method for reducing the transmission power of an uplink signal, comprising: performing, by a User Equipment (UE), Component Carrier (CC) grouping on configured uplink CCs; and comparing correspondingly the transmission power of an uplink signal in each CC group with a maximum transmission power configured for the each CC group by an evolved Node B (eNB), and performing a power reduction within the CC group when the comparison result meets an intra-group power reduction condition; and/or comparing the sum of transmission powers of uplink signals in all CC groups with a maximum transmission power configured for the UE by the eNB, when the comparison result meets an inter-group power reduction condition, performing a power reduction between the CC groups. The present disclosure further provides a device for reducing the transmission power of an uplink signal. The technical solution of the present disclosure can improve the covering capability and reliability of the uplink signal in an Inter-band CA scenario, and to improve a utilization rate of a UE's uplink transmission power.

13 Claims, 5 Drawing Sheets

METHOD AND DEVICE FOR REDUCING TRANSMISSION POWER OF UPLINK SIGNAL

TECHNICAL FIELD

The present disclosure relates to technologies of $3^{rd}$ Generation Partnership Project (3GPP) Long Term Evolution (LTE) and Long Term Evolution Advanced (LTE-A), and in particular to a method and a device for reducing the transmission power of an uplink signal.

BACKGROUND

As an evolved version of LTE, LTE-A is intended to meet a higher demand and more applications in the wireless communication market over the next few years, to meet and surpass a demand of International Mobile Telecommunications-Advanced (IMT-Advanced), and meanwhile to keep a better backward compatibility to LTE.

To meet the demand of IMT-Advanced, a Carriers Aggregation (CA) technology is adopted in LTE-A to further support a wider communication bandwidth than that of LTE. The main principle of the CA is that a maximum bandwidth of 100 MHz can be supported by aggregating multiple carriers which are backward compatible to LTE. The CA includes two application scenarios: Inter-band CA and Intra-band CA.

In a system where the CA is introduced, a carrier which is aggregated is referred to as a Component Carrier (CC), and also as a Cell. Furthermore, concepts of a Primary Component Carrier/Cell (PCC/PCell) and a Secondary Component Carrier/Cell (SCC/SCell) are proposed. In a system where carriers are aggregated, there are at least one PCC/PCell and one SCC/SCell, wherein the PCC/PCell is always at the activated state.

When the CA is an Inter-band CA, a User Equipment (UE) has multiple Power Amplifiers (PAs) to support simultaneous transmissions of user uplink signals on multiple CCs located on multiple frequency bands, at this point, uplink signals on each CC are sent by pre-configured PAs.

In an Intra-band CA scenario, when uplink signals on multiple CCs are sent simultaneously, if the total transmission power of the uplink signals on the multiple CCs exceeds a maximum linear power supported by a PA, a power reduction is performed on all the uplink signals, to ensure that the sum of transmission powers of all the uplink signals does not exceed the maximum linear power supported by the PA.

However, in an Inter-band CA scenario, since a UE has multiple PAs, and uplink signals on a specific CC are sent by a pre-configured PA, an evolved Node B (eNB) configures a maximum transmission power of a CC carried by the PA according to the capability of the PA, this may result in the case that a total transmission power of uplink signals on one or more PAs exceeds the maximum linear power of the PA and a power reduction is needed, while a total power of uplink signals on other PAs does not exceed the maximum linear power of the PA and a power reduction is not needed.

The power reduction formula, in TS 36.213 Release 10 of the current LTE standard, is established based on an Intra-band CA scenario. If a power reduction in an Inter-band CA scenario is performed according to the power reduction formula in TS 36.213 Release 10, transmission powers of uplink signals carried by CCs, on which a power reduction does not have to performed, will be reduced, thus lowering covering capabilities and reliabilities of uplink signals, whilst lowering a utilization rate of a UE's uplink transmission power.

SUMMARY

In view of the above, the present disclosure provides a method and a device for reducing the transmission power of a uplink signal, so as to improve the covering capability and reliability of the uplink signal in an Inter-band CA scenario, and to improve a utilization rate of a UE's uplink transmission power.

Therefore, the technical solutions of the present disclosure are implemented as follows.

The present disclosure provides a method for reducing the transmission power of an uplink signal, comprising:

a UE performs Component Carrier (CC) grouping on configured uplink CCs; and the transmission power of an uplink signal in each CC group is compared correspondingly with a maximum transmission power configured for each CC group by an evolved Node B (eNB), a power reduction is performed within the CC group when the comparison result meets a intra-group power reduction condition.

In the above technical solution, the UE performing CC grouping on configured uplink CCs comprises: the UE performs CC grouping according to a specified signaling or performs CC grouping according to a pre-defined CC grouping method.

In the above technical solution, the performing CC grouping according to a pre-defined CC grouping method comprises:

CCs in a successive frequency band are classified into one CC group; or CCs using a same Power Amplifier (PA) are classified into one CC group; or CCs with a frequency difference between their used frequency points smaller than a frequency difference threshold pre-defined between a base station and the UE, are classified into one CC group.

In the above technical solution, the intra-group power reduction condition that the comparison result meets comprises: the transmission powers of one or more uplink signals in the CC group exceeds the maximum transmission power configured for the CC group by the eNB.

In the above technical solution, the performing a power reduction within the CC group comprises:

when an uplink signal in a CC group exceeding a maximum transmission power configured for the CC group by an eNB includes both Physical Uplink Shared Channels (PUSCHs) and Physical Uplink Control Channels (PUCCHs), transmission powers of all PUSCHs are multiplied by a same power reduction coefficient to reduce the transmission powers of all the PUSCHs with an equal proportion, until that the transmission power of the uplink signal in the CC group does not exceed the maximum transmission power configured for the CC group by the eNB;

when the uplink signal in the CC group exceeding the maximum transmission power configured for the CC group by the eNB includes both PUSCHs and PUCCHs, and a part of the PUSCHs carry Uplink Control Information (UCI), other PUSCHs carry only user data, transmission powers of all the PUSCHs carrying only user data are multiplied by a same power reduction coefficient to reduce the transmission powers of all the PUSCHs carrying only user data with an equal proportion, until that the transmission power of the uplink signal in the CC group does not exceed the maximum transmission power configured for the CC group by the eNB;

when the uplink signal in the CC group exceeding the maximum transmission power configured for the CC group by the eNB includes more than one PUSCHs, and a part of the PUSCHs carry UCI, other PUSCHs carry only user data, transmission powers of all the PUSCHs carrying only user data are multiplied by a same power reduction coefficient to reduce the transmission powers of all the PUSCHs carrying only user data with an equal proportion, until that the transmission power of the uplink signal in the CC group does not exceed the maximum transmission power configured for the CC group by the eNB;

when the uplink signal in the CC group exceeding the maximum transmission power configured for the CC group by the eNB includes more than one PUSCHs carrying only user data, transmission powers of all the PUSCHs are multiplied by a same power reduction coefficient to reduce the transmission powers of all the PUSCHs with an equal proportion, until that the transmission power of the uplink signal in the CC group does not exceed the maximum transmission power configured for the CC group by the eNB; and when the uplink signal in the CC group exceeding the maximum transmission power configured for the CC group by the eNB includes more than one Sounding Reference Signals (SRSs), transmission powers of all the SRSs are multiplied by a same power reduction coefficient to reduce the transmission powers of all the SRSs with an equal proportion, until that the transmission power of the uplink signal in the CC group does not exceed the maximum transmission power configured for the CC group by the eNB.

In the above technical solution, the method further comprises:

the sum of transmission powers of uplink signals in all CC groups is compared with a maximum transmission power configured for the UE by the eNB, when the comparison result meets an inter-group power reduction condition, a power reduction is performed between the CC groups.

In the above technical solution, the comparison result meeting the inter-group power reduction condition comprises: the sum of the transmission powers of the uplink signals in all the CC groups exceeds the maximum transmission power configured for the UE by the eNB.

In the above technical solution, the performing a power reduction between the CC groups comprises at least one of followings:

Way 1: after the power reduction is performed within the CC group, the transmission power of an uplink signal in a reduced CC group is reduced sequentially, until that the sum of the transmission powers of the uplink signals in all the CC groups does not exceed the maximum transmission power configured for the UE by the eNB;

Way 2: after the power reduction is performed within the CC group, the transmission power of an uplink signal in a non-reduced CC group is reduced, until that the sum of the transmission powers of the uplink signals in all the CC groups does not exceed the maximum transmission power configured for the UE by the eNB;

Way 3: priorities are set between the CC groups, transmission powers of uplink signals in the CC groups are reduced in order of priority, until that the sum of the transmission powers of the uplink signals in all the CC groups does not exceed the maximum transmission power configured for the UE by the eNB; and Way 4: priority groups are set between the CC groups, transmission powers of uplink signals in the CC groups are reduced in order of priority group, until that the sum of the transmission powers of the uplink signals in all the CC groups does not exceed the maximum transmission power configured for the UE by the eNB.

In the above technical solution, in the ways of power reduction between the CC groups, the transmission powers of one or more CC groups are reduced.

The present disclosure provides a method for reducing the transmission power of an uplink signal, comprising:

a UE performs CC grouping on configured uplink CCs; and the sum of transmission powers of uplink signals in all CC groups is compared with a maximum transmission power configured for the UE by an eNB, when the comparison result meets an inter-group power reduction condition, a power reduction is performed between the CC groups.

The present disclosure provides a device for reducing the transmission power of a uplink signal, comprising a CC grouping module, a reduction determination module and a reduction module, wherein the CC grouping module is configured to perform CC grouping on uplink CCs configured by a UE;

the reduction determination module is configured to compare correspondingly the transmission power of an uplink signal in each CC group with a maximum transmission power configured for the each CC group by an eNB, and to notify the reduction module when the comparison result meets an intra-group power reduction condition; and the reduction module is configured to perform a power reduction within the CC group when the comparison result meets the intra-group power reduction condition.

In the above technical solution, the CC grouping module is specifically configured to classify CCs in a successive frequency band into one CC group; or classify, CCs with a frequency difference of frequency points smaller than a frequency difference threshold pre-defined between a base station and the UE, into one CC group.

In the above technical solution, the reduction module performing a power reduction within the CC group comprises:

when an uplink signal in a CC group exceeding a maximum transmission power configured for the CC group by an eNB includes both PUSCHs and PUCCHs, the reduction module ensures preferentially transmission powers of the PUCCHs, and multiplies transmission powers of all PUSCHs by a same power reduction coefficient to reduce the transmission powers of all the PUSCHs with an equal proportion, until that the transmission power of the uplink signal in the CC group does not exceed the maximum transmission power configured for the CC group by the eNB;

when the uplink signal in the CC group exceeding the maximum transmission power configured for the CC group by the eNB includes both PUSCHs and PUCCHs, and a part of the PUSCHs carry UCI, other PUSCHs carry only user data, the reduction module ensures preferentially transmission powers of the PUCCHs and transmission powers of the PUSCHs carrying UCI, and multiplies transmission powers of all the PUSCHs carrying only user data by a same power reduction coefficient to reduce the transmission powers of all the PUSCHs carrying only user data with an equal proportion, until that the transmission power of the uplink signal in the CC group does not exceed the maximum transmission power configured for the CC group by the eNB;

when the uplink signal in the CC group exceeding the maximum transmission power configured for the CC group by the eNB includes more than one PUSCHs, and a part of the PUSCHs carry UCI, other PUSCHs carry only user data, the reduction module ensures preferentially transmission powers of the PUSCHs carrying UCI, and multiplies transmission powers of all the PUSCHs carrying only user data by a same power reduction coefficient to reduce the transmission powers of all the PUSCHs carrying only user data with an equal proportion, until that the transmission power of the uplink signal in the CC group does not exceed the maximum transmission power configured for the CC group by the eNB;

when the uplink signal in the CC group exceeding the maximum transmission power configured for the CC group by the eNB includes more than one PUSCHs carrying only user data, the reduction module multiplies transmission powers of all the PUSCHs by a same power reduction coefficient to reduce the transmission powers of all the PUSCHs with an equal proportion, until that the transmission power of the uplink signal in the CC group does not exceed the maximum transmission power configured for the CC group by the eNB; and when the uplink signal in the CC group exceeding the maximum transmission power configured for the CC group by the eNB includes more than one SRSs, transmission powers of all the SRSs are multiplied by a same power reduction coefficient to reduce the transmission powers of all the SRSs with an equal proportion, until that the transmission power of the uplink signal in the CC group does not exceed the maximum transmission power configured for the CC group by the eNB.

In the above technical solution, the reduction determination module is further configured to compare the sum of transmission powers of uplink signals in all CC groups with a maximum transmission power configured for the UE by the eNB, and to notify the reduction module when the comparison result meets an inter-group power reduction condition; and the reduction module is further configured to perform a power reduction using CC group as the unit between the CC groups when the comparison result meets the inter-group power reduction condition.

In the above technical solution, the reduction module performs a power reduction between the CC groups by using one of followings:

Way 1: after the power reduction is performed within the CC group, the transmission power of an uplink signal in a reduced CC group is reduced sequentially, until that the sum of the transmission powers of the uplink signals in all the CC groups does not exceed the maximum transmission power configured for the UE by the eNB;

Way 2: after the power reduction is performed within the CC group, the transmission power of an uplink signal in a non-reduced CC group is reduced, until that the sum of the transmission powers of the uplink signals in all the CC groups does not exceed the maximum transmission power configured for the UE by the eNB;

Way 3: priorities are set between the CC groups, the reduction is performed on transmission powers of uplink signals between the CC groups in order of priority, until that the sum of the transmission powers of the uplink signals in all the CC groups does not exceed the maximum transmission power configured for the UE by the eNB; and Way 4: priority groups are set between the CC groups, the reduction is performed on transmission powers of uplink signals between the CC groups in order of priority group, until that the sum of the transmission powers of the uplink signals in all the CC groups does not exceed the maximum transmission power configured for the UE by the eNB.

The method provides a device for reducing the transmission power of a uplink signal, comprising a CC grouping module, a reduction determination module and a reduction module, wherein the CC grouping module is configured to perform CC grouping on uplink CCs configured by a UE;

the reduction determination module is configured to compare the sum of transmission powers of uplink signals in all CC groups with a maximum transmission power configured for the each CC group by an eNB, and to notify the reduction module when the comparison result meets an inter-group power reduction condition; and the reduction module is configured to perform a power reduction using CC group as the unit between the CC groups when the comparison result meets the inter-group power reduction condition.

The present disclosure provides a method and a device for reducing the transmission power of an uplink signal, comprising: a UE performs CC grouping on configured uplink CCs, and the transmission power of an uplink signal in each CC group is compared correspondingly with a maximum transmission power configured for the each CC group by an evolved eNB, when the comparison result meets an intra-group power reduction condition, a power reduction is performed within the CC group; and/or the sum of transmission powers of uplink signals in all CC groups is compared with a maximum transmission power configured for the UE by an eNB, when the comparison result meets a inter-group power reduction condition, a power reduction using CC group as the unit is performed between the CC groups; thus improving the covering capability and reliability of the uplink signal in an Inter-band CA scenario, and improving a utilization rate of a UE's uplink transmission power.

DETAILED DESCRIPTION

The basic spirit of the present disclosure lies in: a UE performs CC grouping on configured uplink CCs, and the transmission power of an uplink signal in each CC group is compared correspondingly with a maximum transmission power configured for the each CC group by an evolved eNB, when the comparison result meets a intra-group power reduction condition, a power reduction is performed within the CC group;

and/or the sum of transmission powers of uplink signals in all CC groups is compared with a maximum transmission power configured for the UE by an eNB (expressed as $P_{CMAX}$ in TS 36.213 Release 10), when the comparison result meets a inter-group power reduction condition, a power reduction using CC group as the unit is performed between the CC groups.

The present disclosure will be further explained in detail below with reference to accompanying drawings and specific embodiments.

Figure 1:
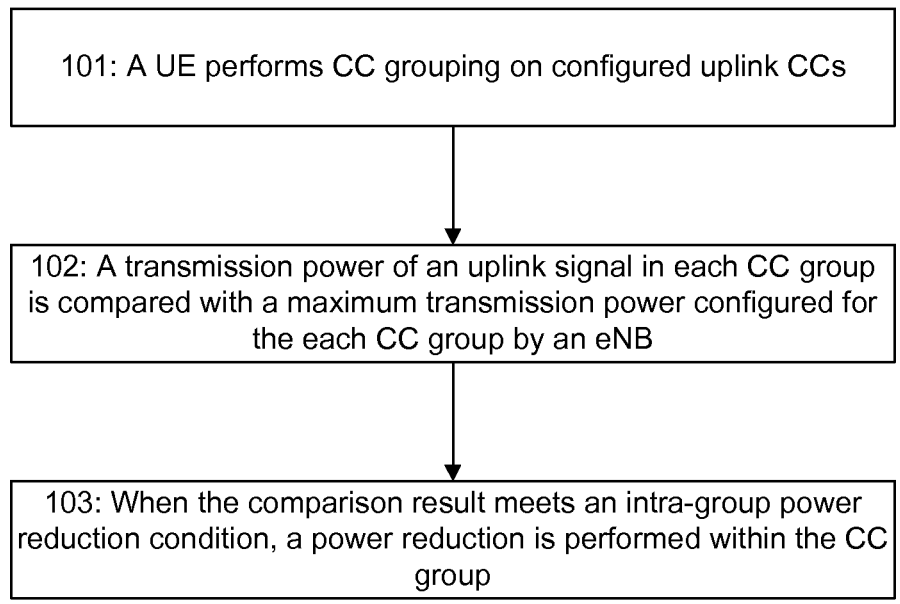
FIG. 1 shows a schematic flow chart for implementing a method for reducing the transmission power of an uplink signal according to the present disclosure.

The present disclosure implements a method for reducing the transmission power of an uplink signal, as shown in FIG. 1, the method includes the following steps:

step 101: A UE performs CC grouping on configured uplink CCs;

In this step, the UE performs CC grouping according to a specified signaling or performs CC grouping according to a pre-defined CC grouping method;

The performing CC grouping according to a specified signalling generally comprises: performing CC grouping according to a DCI signalling of an evolved Node B (eNB);

The performing CC grouping according to a pre-defined CC grouping method comprises:

CCs in a successive frequency band are classified into one CC group; or CCs using a same Power Amplifier (PA) are classified into one CC group, until that the quantity of CC groups is finally equal to the quantity of PAs configured by the UE; or CCs with a frequency difference between their used frequency points smaller than a pre-defined frequency difference threshold between a base station and the UE, are classified into one CC group.

step 102: The transmission power of an uplink signal in each CC group is compared correspondingly with a maximum transmission power configured for the each CC group by an eNB;

Specifically, the eNB configures the maximum transmission power for each CC group and configures a UE maximum transmission power for the UE, calculates the transmission power of the uplink signal in the each CC group in a subframe, and determines whether the transmission power of the uplink signal in the each CC group exceeds the maximum transmission power configured for the each CC group by the eNB.

The step further comprises: the sum of transmission powers of uplink signals in all CC groups is compared with a maximum transmission power configured for the UE by the eNB; specifically, the eNB calculates the sum of the transmission powers of the uplink signals in all CC groups, and determines whether the sum of the transmission powers of the uplink signals in all CC groups exceeds the maximum transmission power configured for the UE by the eNB;

In the step, when the transmission power of the uplink signal in each CC group is compared correspondingly with the maximum transmission power configured for the each CC group by the eNB, and when the sum of the transmission powers of the uplink signals in all CC groups is compared with the maximum transmission power configured for the UE by the eNB, there is no requirement on the sequence of the comparison, that is to say, it is OK that firstly the transmission power of the uplink signal in each CC group is calculated and compared corresponding with the maximum transmission power configured for each CC by the eNB, then the sum of the transmission powers of the uplink signals in all CC groups is calculated and compared with the maximum transmission power configured for the UE by the eNB; it is also OK that firstly the sum of the transmission powers of the uplink signals in all CC groups is calculated and compared with the maximum transmission power configured for the UE by the eNB, then the transmission power of the uplink signal in each CC group is calculated and compared corresponding with the maximum transmission power configured for each CC by the eNB;

Further, the formula for calculating the transmission power of an uplink signal is a formula for calculating the transmission power of an uplink signal in TS 36.213 Release 10.

step 103: When the comparison result meets an intra-group power reduction condition, a power reduction is performed within the CC group;

In the step, the comparison result meeting an intra-group power reduction condition: the transmission powers of one or more uplink signals in the CC group exceeds the maximum transmission power configured for the CC group by the eNB;

The step further comprises: when the comparison result meets an inter-group power reduction condition, a power reduction is performed between the CC groups;

The comparison result meeting the inter-group power reduction condition comprises:

the sum of the transmission powers of the uplink signals in all the CC groups exceeds the maximum transmission power configured for the UE by the eNB.

The uplink signal may be transmitted on a Physical Uplink Shared Channel (PUSCH) or a Physical Uplink Control Channel (PUCCH) or may be a Sounding Reference Signal (SRS), wherein the SRS includes a single transmission of an Aperiodic-Sounding Reference Signal (A-SRS) and a single transmission of a Periodic-Sounding Reference Signal (P-SRS) or a simultaneous transmission of the both.

The performing a power reduction within the CC group comprises: performing a power reduction within the CC group according to a way for reducing power in TS 36.213 Release 10, that is:

when an uplink signal in a CC group exceeding a maximum transmission power configured for the CC group by an eNB includes PUSCHs and PUCCHs, transmission powers of the PUCCHs are ensured preferentially, and transmission powers of all PUSCHs are multiplied by a same power reduction coefficient W(i) to reduce with equal proportion the transmission powers of all the PUSCHs by controlling values of W(i), until that the transmission power of the uplink signal in the CC group does not exceed the maximum transmission power configured for the CC group by the eNB;

when the uplink signal in the CC group exceeding the maximum transmission power configured for the CC group by the eNB includes PUSCHs and PUCCHs, and a part of the PUSCHs carry Uplink Control Information (UCI), other PUSCHs carry only user data, transmission powers of the PUCCHs and transmission powers of the PUSCHs carrying UCI are ensured preferentially, and transmission powers of all the PUSCHs carrying only user data are multiplied by the same power reduction coefficient W(i) to reduce with equal proportion the transmission powers of all the PUSCHs carrying only user data by controlling values of W(i), until that the transmission power of the uplink signal in the CC group does not exceed the maximum transmission power configured for the CC group by the eNB;

when the uplink signal in the CC group exceeding the maximum transmission power configured for the CC group by the eNB includes more than one PUSCHs, and a part of the PUSCHs carry UCI, other PUSCHs carry only user data, transmission powers of the PUSCHs carrying UCI are ensured preferentially, and transmission powers of all the PUSCHs carrying only user data are multiplied by the same power reduction coefficient W(i) to reduce with equal proportion the transmission powers of all the PUSCHs carrying only user data by controlling values of W(i), until that the transmission power of the uplink signal in the CC group does not exceed the maximum transmission power configured for the CC group by the eNB;

when the uplink signal in the CC group exceeding the maximum transmission power configured for the CC group by the eNB includes multiple PUSCHs carrying only user data, transmission powers of all the PUSCHs are multiplied by the same power reduction coefficient W(i) to reduce with equal proportion the transmission powers of all the PUSCHs by controlling values of W(i), until that the transmission power of the uplink signal in the CC group does not exceed the maximum transmission power configured for the CC group by the eNB; and when the uplink signal in the CC group exceeding the maximum transmission power configured for the CC group by the eNB includes more than one SRSs transmitted simultaneously, transmission powers of all the SRSs are multiplied by a same power reduction coefficient W(i) to reduce with equal proportion the transmission powers of all the SRSs by controlling values of W(i), until that the transmission power of the uplink signal in the CC group does not exceed the maximum transmission power configured for the CC group by the eNB.

The performing a power reduction using CC group as the unit between the CC groups comprises at least one of followings:

Way 1: after the power reduction is performed within the CC group, the transmission power of an uplink signal in a reduced CC group is reduced sequentially, until that the sum of the transmission powers of the uplink signals in all the CC groups does not exceed the maximum transmission power configured for the UE by the eNB;

Way 2: after the power reduction is performed within the CC group, the transmission power of an uplink signal in a non-reduced CC group is reduced, until that the sum of the transmission powers of the uplink signals in all the CC groups does not exceed the maximum transmission power configured for the UE by the eNB;

Way 3: priorities are set between the CC groups, transmission powers of uplink signals in the CC groups are reduced in order of priority, i.e., the transmission power of an uplink signal in the CC group with the lowest priority is reduced firstly, then transmission powers of uplink signals in CC group with higher priorities are reduced, until that the sum of the transmission powers of the uplink signals in all the CC groups does not exceed the maximum transmission power configured for the UE by the eNB; and Way 4: priority groups are set between the CC groups, transmission powers of uplink signals in the CC groups are reduced in order of priority group, i.e., transmission powers of uplink signals in all CC groups with the lowest priority group are firstly reduced with equal proportion, then transmission powers of uplink signals in all CC groups with higher priority groups are reduced with equal proportion, until that the sum of the transmission powers of the uplink signals in all the CC groups does not exceed the maximum transmission power configured for the UE by the eNB.

Further, in the ways of power reduction between the CC groups, the number of the CC groups being reduced may be one or multiple.

Further, the above transmission power reduction of uplink signals in ways 1-3 may be an equally-proportional reduction or following the power reduction method in TS 36.213 Release 10 (i.e., following a reduction method in a CC group, reducing transmission powers of uplink signals).

Further, when there are multiple different physical channels or physical channels and SRSs in a CC group, transmission powers of multiple physical channels or physical channels and SRSs can be reduced simultaneously, or only transmission powers of a specified physical channel or physical channel and SRS can be reduced.

Further, the setting priorities between CC groups comprises at least one of followings:

Way 1: CC indexes of CCs in respective CC groups are compared, a CC group where a CC having a smallest CC index is located is set to a highest priority or a CC group where a CC having a largest CC index is located is set to a highest priority;

Way 2: A CC group including a PCell is set to a highest priority, priorities of other CC groups are set according to way 1;

Way 3: A CC group including more CCs is set to higher priority, if CC groups include same quantity of CCs, their priorities are set according to way 1;

Way 4: A CC group where a CC of an uplink signal including a PUCCH is located is set to a highest priority, if uplink signals in multiple CC groups include a PUCCH, their priorities are set according to way 1, and priorities of other CC groups having uplink signals including no PUCCHs are also set according to way 1;

Way 5: If uplink signals are multiple SRSs simultaneously transmitted on multiple CCs, a CC group where its uplink signal includes an A-SRS transmission is set to a highest priority, and priorities of CC groups including only a P-SRS are set according to way 1;

Way 6: If uplink signals are multiple SRSs simultaneously transmitted on multiple CCs, a CC group where its uplink signal includes an A-SRS transmission is set to a highest priority, and for other CC groups, maximum P-SRS periods of respective CC groups are compared, then priorities of CC groups corresponding to respective SRSs are set ascendingly according to lengths of the maximum P-SRS periods descendingly;

Way 7: If uplink signals are multiple SRSs simultaneously transmitted on multiple CCs, a CC group where its uplink signal includes an A-SRS transmission is set to a highest priority, and for other CC groups, a CC group including a PCell has a highest priority, priorities of other CC groups including only a P-SRS are set according to way 1;

Way 8: If uplink signals are multiple SRSs simultaneously transmitted on multiple CCs, a CC group where its uplink signal includes an A-SRS transmission is set to a highest priority, and for other CC groups, a CC group including a PCell has a highest priority, priorities of other CC groups including only a P-SRS are set according to their P-SRS transmission bandwidths, i.e., maximum P-SRS bandwidths transmitted within respective CC groups are compared, the larger the maximum P-SRS bandwidth, the higher the priority of the CC group, for CC groups having a same maximum P-SRS bandwidth, their priorities are set according to way 1 or according to lengths of maximum P-SRS periods in way 6;

Way 9: Priorities of respective CC groups are set according to a specified signalling, which is transmitted by a high layer, such as an eNB.

Further, the setting priority groups between CC groups comprises at least one of followings:

Way 1: CC groups including a PCell are set as a same priority group having a high priority, other CC groups are set as a same priority group having a low priority;

Way 2: Priority groups are set according to quantities of CCs included in CC groups, a CC group including most CCs belongs to a priority group having a highest priority, other CC groups belong to priority groups having lower priorities according to quantities of CCs included thereof, wherein CC groups including a same quantity of CCs belong to a same priority group; for example, CC group 1 has 3 CCs, while CC group 2 and CC group 3 have only 1 CC, then CC group 1 is set as a priority group having the highest priority, and CC group 2 and CC group 3 belong to a same priority group having a low priority;

Way 3: CC groups including a PUCCH are set as a same priority group having a high priority, and CC groups including no PUCCHs belong to a same priority group having a low priority;

Way 4: If uplink signals are multiple SRSs simultaneously transmitted on multiple CCs, CC groups including an A-SRS are set as a same priority group having a higher priority, and CC groups including only a P-SRS are set as a same priority group having a lower priority;

Way 5: If uplink signals are multiple SRSs simultaneously transmitted on multiple CCs, CC groups including an A-SRS are set as a same priority group having a highest priority, CC groups including a PCell and a P-SRS are set as a same priority group having a second highest priority, and other CC groups including only a P-SRS are set as a same priority group having a lower priority;

Way 6: Priority groups of respective CC groups are set according to a specified signalling, which is transmitted by a high layer, such as an eNB.

The present disclosure further implements a method for reducing the transmission power of an uplink signal, comprising: a UE performs CC grouping on configured uplink CCs; and the sum of transmission powers of uplink signals in all CC groups is compared with a maximum transmission power configured for the UE by an eNB, when the comparison result meets an inter-group power reduction condition, a power reduction using CC group as the unit is performed between the CC groups.

The comparison result meeting the inter-group power reduction condition comprises: the sum of the transmission powers of the uplink signals in all the CC groups exceeds the maximum transmission power configured for the UE by the eNB.

The performing a power reduction between the CC groups comprises at least one of followings:

Way 1: after the power reduction is performed within the CC group, the transmission power of an uplink signal in a reduced CC group is reduced sequentially, until that the sum of the transmission powers of the uplink signals in all the CC groups does not exceed the maximum transmission power configured for the UE by the eNB;

Way 2: after the power reduction is performed within the CC group, the transmission power of an uplink signal in a non-reduced CC group is reduced, until that the sum of the transmission powers of the uplink signals in all the CC groups does not exceed the maximum transmission power configured for the UE by the eNB;

Way 3: priorities are set between the CC groups, transmission powers of uplink signals in the CC groups are reduced in order of priority, until that the sum of the transmission powers of the uplink signals in all the CC groups does not exceed the maximum transmission power configured for the UE by the eNB; and Way 4: priority groups are set between the CC groups, transmission powers of uplink signals in the CC groups are reduced in order of priority group, until that the sum of the transmission powers of the uplink signals in all the CC groups does not exceed the maximum transmission power configured for the UE by the eNB.

in the ways of power reduction between the CC groups, the number of the CC groups being reduced is one or more than one.

Figure 2:
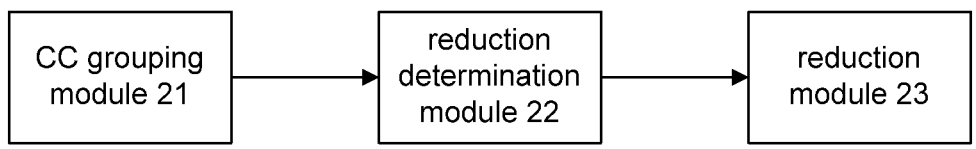
FIG. 2 shows a schematic flow chart for implementing a device for reducing the transmission power of an uplink signal according to the present disclosure.

In order to implement above methods, the present disclosure further provides a device for reducing the transmission power of an uplink signal, which is provided on a UE, as shown in FIG. 2, the device comprises a CC grouping module 21, a reduction determination module 22 and a reduction module 23, wherein the CC grouping module 21 is configured to perform CC grouping on uplink CCs configured by a UE;

the reduction determination module 22 is configured to compare correspondingly the transmission power of an uplink signal in each CC group with a maximum transmission power configured for the each CC group by an eNB, and to notify the reduction module 23 when the comparison result meets an intra-group power reduction condition; and the reduction module 23 is configured to perform a power reduction within the CC group when the comparison result meets the intra-group power reduction condition;

the CC grouping module 21 is specifically configure to perform CC grouping according to a specified signaling or perform CC grouping according to a pre-defined CC grouping method;

the CC grouping module 21 is specifically configured to classify CCs in a successive frequency band into one CC group, until that the quantity of CC groups is equal to the quantity of non-successive frequency band after carriers aggregation; or classify CCs using a same PA into one CC group, until that the quantity of CC groups is equal to the quantity of PAs configured by the UE; or classify CCs with a frequency difference of frequency points smaller than a pre-defined frequency difference threshold between a base station and the UE, into one CC group;

the reduction module 23 performing a power reduction within the CC group comprises: performing a power reduction within the CC group according to a way for reducing power in TS 36.213 Release 10, that is:

when an uplink signal in a CC group exceeding a maximum transmission power configured for the CC group by an eNB includes PUSCHs and PUCCHs transmitted simultaneously, the reduction module 23 ensures preferentially transmission powers of the PUCCHs, and multiplies transmission powers of all PUSCHs by a same power reduction coefficient W(i) to reduce with equal proportion the transmission powers of all the PUSCHs by controlling values of W(i), until that the transmission power of the uplink signal in the CC group does not exceed the maximum transmission power configured for the CC group by the eNB;

when the uplink signal in the CC group exceeding the maximum transmission power configured for the CC group by the eNB includes PUSCHs and PUCCHs transmitted simultaneously, and a part of the PUSCHs carry Uplink Control Information (UCI), other PUSCHs carry only user data, the reduction module 23 ensures preferentially transmission powers of the PUCCHs and transmission powers of the PUSCHs carrying UCI, and multiplies transmission powers of all the PUSCHs carrying only user data by the same power reduction coefficient W(i) to reduce with equal proportion the transmission powers of all the PUSCHs carrying only user data by controlling values of W(i), until that the transmission power of the uplink signal in the CC group does not exceed the maximum transmission power configured for the CC group by the eNB;

when the uplink signal in the CC group exceeding the maximum transmission power configured for the CC group by the eNB includes more than one PUSCHs transmitted simultaneously, and a part of the PUSCHs carry UCI, other PUSCHs carry only user data, the reduction module 23 ensures preferentially transmission powers of the PUSCHs carrying UCI, and multiplies transmission powers of all the PUSCHs carrying only user data by the same power reduction coefficient W(i) to reduce with equal proportion the transmission powers of all the PUSCHs carrying only user data by controlling values of W(i), until that the transmission power of the uplink signal in the CC group does not exceed the maximum transmission power configured for the CC group by the eNB;

when the uplink signal in the CC group exceeding the maximum transmission power configured for the CC group by the eNB includes multiple PUSCHs carrying only user data, the reduction module 23 multiplies transmission powers of all the PUSCHs by the same power reduction coefficient W(i) to reduce with equal proportion the transmission powers of all the PUSCHs by controlling values of W(i), until that the transmission power of the uplink signal in the CC group does not exceed the maximum transmission power configured for the CC group by the eNB; and when the uplink signal in the CC group exceeding the maximum transmission power configured for the CC group by the eNB includes more than one SRSs transmitted simultaneously, the reduction module 23 multiplies transmission powers of all the SRSs by a same power reduction coefficient W(i) to reduce with equal proportion the transmission powers of all the SRSs by controlling values of W(i), until that the transmission power of the uplink signal in the CC group does not exceed the maximum transmission power configured for the CC group by the eNB.

The reduction determination module 22 is further configured to compare the sum of transmission powers of uplink signals in all CC groups with a maximum transmission power configured for the UE by the eNB, and to notify the reduction module 23 when the comparison result meets a inter-group power reduction condition; and the reduction module 23 is further configured to perform a power reduction using CC group as the unit between the CC groups when the comparison result meets the inter-group power reduction condition;

the reduction module 23 performs a power reduction using CC group as the unit between the CC groups by using one of followings:

Way 1: after the power reduction is performed within the CC group, the transmission power of an uplink signal in a reduced CC group is reduced sequentially, until that the sum of the transmission powers of the uplink signals in all the CC groups does not exceed the maximum transmission power configured for the UE by the eNB;

Way 2: after the power reduction is performed within the CC group, the transmission power of an uplink signal in a non-reduced CC group is reduced, until that the sum of the transmission powers of the uplink signals in all the CC groups does not exceed the maximum transmission power configured for the UE by the eNB;

Way 3: priorities are set between the CC groups, transmission powers of uplink signals in the CC groups are reduced in order of priority, i.e., the transmission power of an uplink signal in the CC group with the lowest priority is reduced firstly, then transmission powers of uplink signals in CC group with higher priorities are reduced, until that the sum of the transmission powers of the uplink signals in all the CC groups does not exceed the maximum transmission power configured for the UE by the eNB; and Way 4: priority groups are set between the CC groups, transmission powers of uplink signals in the CC groups are reduced in order of priority group, i.e., transmission powers of uplink signals in all CC groups with the lowest priority group are firstly reduced with equal proportion, then transmission powers of uplink signals in all CC groups with higher priority groups are reduced with equal proportion, until that the sum of the transmission powers of the uplink signals in all the CC groups does not exceed the maximum transmission power configured for the UE by the eNB.

Further, when the reduction module 23 performs a power reduction between the CC groups, the number of the CC groups being reduced may be one or multiple.

Further, the above transmission power reduction of uplink signals in ways 1-3 may be an equally-proportional reduction or following the power reduction method in TS 36.213 Release 10 (i.e., following a reduction method in a CC group, reducing transmission powers of uplink signals).

Further, when there are multiple different physical channels or physical channels and SRSs in a CC group, transmission powers of multiple physical channels or physical channels and SRSs can be reduced simultaneously, or only transmission powers of a specified physical channel or physical channel and SRS can be reduced.

Further, the setting priorities between CC groups comprises at least one of followings:

Way 1: CC indexes of CCs in respective CC groups are compared, a CC group where a CC having a smallest CC index is located is set to a highest priority or a CC group where a CC having a largest CC index is located is set to a highest priority;

Way 2: A CC group including a PCell is set to a highest priority, priorities of other CC groups are set according to way 1;

Way 3: A CC group including more CCs is set to higher priority, if CC groups include same quantity of CCs, their priorities are set according to way 1;

Way 4: A CC group where a CC of an uplink signal including a PUCCH is located is set to a highest priority, if uplink signals in multiple CC groups include a PUCCH, their priorities are set according to way 1, and priorities of other CC groups having uplink signals including no PUCCHs are also set according to way 1;

Way 5: If uplink signals are multiple SRSs simultaneously transmitted on multiple CCs, a CC group where its uplink signal includes an A-SRS transmission is set to a highest priority, and priorities of CC groups including only a P-SRS are set according to way 1;

Way 6: If uplink signals are multiple SRSs simultaneously transmitted on multiple CCs, a CC group where its uplink signal includes an A-SRS transmission is set to a highest priority, and for other CC groups, maximum P-SRS periods of respective CC groups are compared, then priorities of CC groups corresponding to respective SRSs are set ascendingly according to lengths of the maximum P-SRS periods descendingly;

Way 7: If uplink signals are multiple SRSs simultaneously transmitted on multiple CCs, a CC group where its uplink signal includes an A-SRS transmission is set to a highest priority, and for other CC groups, a CC group including a PCell has a highest priority, priorities of other CC groups including only a P-SRS are set according to way 1;

Way 8: If uplink signals are multiple SRSs simultaneously transmitted on multiple CCs, a CC group where its uplink signal includes an A-SRS transmission is set to a highest priority, and for other CC groups, a CC group including a PCell has a highest priority, priorities of other CC groups including only a P-SRS are set according to their P-SRS transmission bandwidths, i.e., maximum P-SRS bandwidths transmitted within respective CC groups are compared, the larger the maximum P-SRS bandwidth, the higher the priority of the CC group, for CC groups having a same maximum P-SRS bandwidth, their priorities are set according to way 1 or according to lengths of maximum P-SRS periods in way 6;

Way 9: Priorities of respective CC groups are set according to a specified signalling, which is transmitted by a high layer, such as an eNB.

Further, the setting priority groups between CC groups comprises at least one of followings:

Way 1: CC groups including a PCell are set as a same priority group having a high priority, other CC groups are set as a same priority group having a low priority;

Way 2: Priority groups are set according to quantities of CCs included in CC groups, a CC group including most CCs belongs to a priority group having a highest priority, other CC groups belong to other priority groups having lower priorities according to quantities of CCs included thereof, wherein CC groups including a same quantity of CCs belong to a same priority group; for example, CC group 1 has 3 CCs, while CC group 2 and CC group 3 have only 1 CC, then CC group 1 is set as a priority group having the highest priority, and CC group 2 and CC group 3 belong to a same priority group having a low priority;

Way 3: CC groups including a PUCCH are set as a same priority group having a high priority, and CC groups including no PUCCHs belong to a same priority group having a low priority;

Way 4: If uplink signals are multiple SRSs simultaneously transmitted on multiple CCs, CC groups including an A-SRS are set as a same priority group having a higher priority, and CC groups including only a P-SRS are set as a same priority group having a lower priority;

Way 5: If uplink signals are multiple SRSs simultaneously transmitted on multiple CCs, CC groups including an A-SRS are set as a same priority group having a highest priority, CC groups including a PCell and a P-SRS are set as a same priority group having a second highest priority, and other CC groups including only a P-SRS are set as a same priority group having a lower priority;

Way 6: Priority groups of respective CC groups are set according to a specified signalling, which is transmitted by a high layer, such as an eNB.

Based on the above device, the present disclosure further provides a device for reducing the transmission power of an uplink signal, which is provided on a UE, as shown in FIG. 2, the device comprises a CC grouping module 21, a reduction determination module 22 and a reduction module 23, wherein the CC grouping module 21 is configured to perform CC grouping on uplink CCs configured by a UE;

the reduction determination module 22 is configured to compare the sum of transmission powers of uplink signals in all CC groups with a maximum transmission power configured for the UE by the eNB, and to notify the reduction module 23 when the comparison result meets an inter-group power reduction condition; and the reduction module 23 is further configured to perform a power reduction using CC group as the unit between the CC groups when the comparison result meets the inter-group power reduction condition;

the reduction module 23 performs a power reduction using CC group as the unit between the CC groups by using one of followings:

Way 1: after the power reduction is performed within the CC group, the transmission power of an uplink signal in a reduced CC group is reduced sequentially, until that the sum of the transmission powers of the uplink signals in all the CC groups does not exceed the maximum transmission power configured for the UE by the eNB;

Way 2: after the power reduction is performed within the CC group, the transmission power of an uplink signal in a non-reduced CC group is reduced, until that the sum of the transmission powers of the uplink signals in all the CC groups does not exceed the maximum transmission power configured for the UE by the eNB;

Way 3: priorities are set between the CC groups, transmission powers of uplink signals in the CC groups are reduced in order of priority, i.e., the transmission power of an uplink signal in the CC group with the lowest priority is reduced firstly, then transmission powers of uplink signals in CC group with higher priorities are reduced, until that the sum of the transmission powers of the uplink signals in all the CC groups does not exceed the maximum transmission power configured for the UE by the eNB; and Way 4: priority groups are set between the CC groups, transmission powers of uplink signals in the CC groups are reduced in order of priority group, i.e., transmission powers of uplink signals in all CC groups with the lowest priority group are firstly reduced with equal proportion, then transmission powers of uplink signals in all CC groups with higher priority groups are reduced with equal proportion, until that the sum of the transmission powers of the uplink signals in all the CC groups does not exceed the maximum transmission power configured for the UE by the eNB.

Further, when the reduction module 23 performs a power reduction between the CC groups, the number of the CC groups being reduced may be one or multiple.

The implementation process and principle of methods according to the present disclosure will be explained in detail with reference to specific embodiments.

First Embodiment

Figure 3:
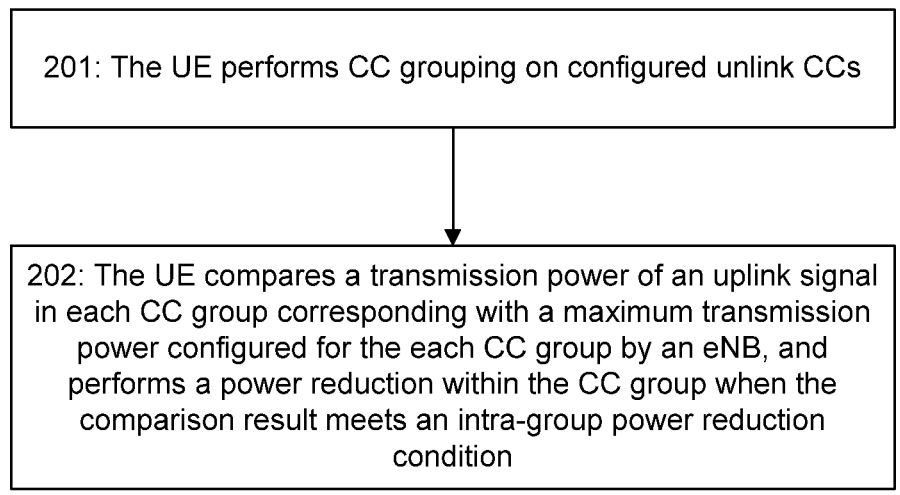
FIG. 3 shows a schematic flow chart for implementing a method for reducing the transmission power of an uplink signal according to a first embodiment of the present disclosure.

It is assumed in the embodiment that a UE configures 4 uplink CCs, i.e., CC1, CC2, CC3 and CC4, and 2 PAs, i.e., PA1 and PA2. A method for reducing the transmission power of an uplink signal is implemented, as shown in FIG. 3, the method comprises the following steps:

Step 201: The UE performs CC grouping on configured unlink CCs.

Specifically, an eNB notifies the UE by a DCI signalling, to classify CC1 and CC2 transmitted by PA1 into CC group 1 and to classify CC3 and CC4 transmitted by PA2 into CC group 2; or the UE classifies CC1 and CC2 transmitted by PA1 into CC group 1 and classifies CC3 and CC4 transmitted by PA2 into CC group 2 according to a pre-defined CC grouping method.

Step 202: The UE compares the transmission power of an uplink signal in each CC group corresponding with a maximum transmission power configured for the each CC group by an eNB, and performs a power reduction within the CC group when the comparison result meets a intra-group power reduction condition.

In the step, it is assumed that for a subframe i, in CC group 1, there are simultaneously a PUCCH transmission and a PUSCH transmission on CC1, there is only a PUSCH transmission on CC2, and $$P_{PUCCH\ CC1}(i)+P_{PUSCH\ CC1}(i)+P_{PUCCH\ CC2}(i) > P_{PA1\ Max}$$

wherein $P_{PUCCH\ CC1}(i)$ is the PUCCH transmission power on CC1, $P_{PUCCH\ CC1}(i)$ is the PUSCH transmission power on CC1, $P_{PUCCH\ CC2}(i)$ is the PUSCH transmission power on CC2, and $P_{PA1\ Max}$ is the maximum power configured for CC group 1 by the eNB.

While for the same subframe I, in CC group 2, there are simultaneously a PUCCH transmission and a PUSCH transmission on CC3, there is only a PUSCH transmission on CC4, and $$P_{PUCCH\ CC3}(i)+P_{PUSCH\ CC3}(i)+P_{PUSCH\ CC4}(i) > P_{PA2\ Max}$$

wherein $P_{PUCCH\ CC3}(i)$ is the PUCCH transmission power on CC3, $P_{PUSCH\ CC3}(i)$ is the PUSCH transmission power on CC3, $P_{PUSCH\ CC4}(i)$ is the PUSCH transmission power on CC4, and $P_{PA2\ Max}$ is the maximum power configured for CC group 2 by the eNB.

Then in the step, the power reduction is performed in CC group 1 according to a power reduction method in TS 36.213 Release 10, i.e., on the premise of ensuring the $P_{PUCCH\ CC1}$, $P_{PUSCH\ CC1}$ and $P_{PUSCH\ CC2}$ are multiplied by a same power reduction factor W(i), to eventually meet the following formula:

$$\sum_{CC} W(i) \cdot P_{PUSCH\ CC}(i) \leq P_{PA1\ Max} - P_{PUCCH\ CC1}(i)$$

wherein CC represents CC1 and CC2.

The embodiment further comprises: if after power reduction, the sum of transmission powers of uplink signals in CC group 1 and CC group 2 is smaller than the maximum transmission power configured for the UE by the eNB, i.e., $$W(i) \cdot P_{PUSCH\ CC1}(i)+P_{PUCCH\ CC1}(i)+W(i) \cdot P_{PUSCH\ CC2}(i)+P_{PUSCH\ CC3}(i)+P_{PUCCH\ CC3}(i)+P_{PUSCH\ CC4}(i) \leq P_{CMAX}$$

the uplink signals are transmitted directly, wherein $P_{CMAX}$ represents the maximum transmission power configured for the UE by the eNB.

Second Embodiment

Figure 4:
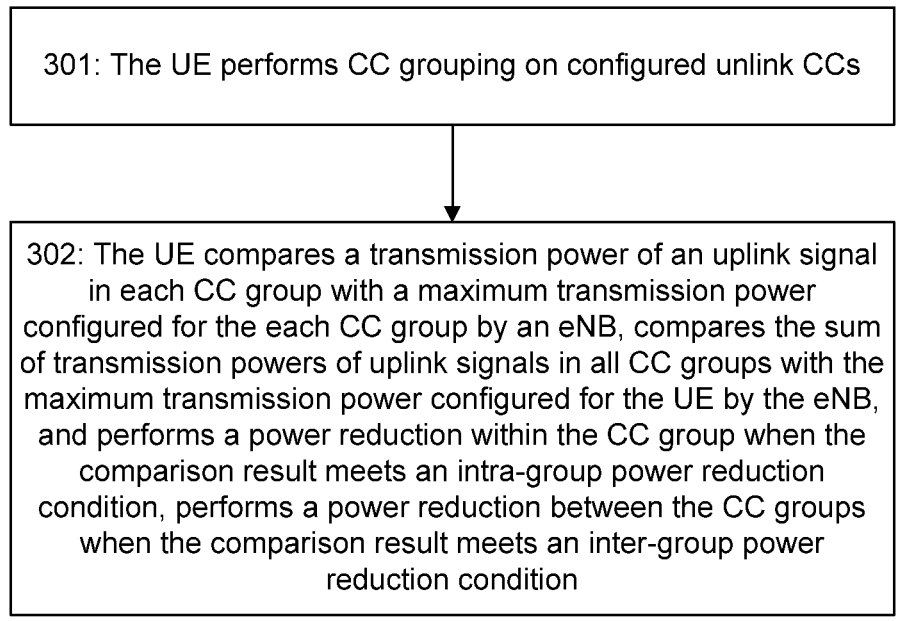
FIG. 4 shows a schematic flow chart for implementing a method for reducing the transmission power of an uplink signal according to a second embodiment of the present disclosure.

It is assumed in the embodiment that a UE configures 4 uplink CCs, i.e., CC1, CC2, CC3 and CC4, and 2 PAs, i.e., PA1 and PA2. A method for reducing the transmission power of an uplink signal is implemented, as shown in FIG. 4, the method comprises the following steps:

Step 301: The UE performs CC grouping on configured unlink CCs.

Specifically, an eNB notifies the UE by a DCI signalling, to classify CC1 and CC2 transmitted by PA1 into CC group 1 and to classify CC3 and CC4 transmitted by PA2 into CC group 2; or the UE classifies CC1 and CC2 transmitted by PA1 into CC group 1 and classifies CC3 and CC4 transmitted by PA2 into CC group 2 according to a pre-defined CC grouping method.

Step 302: The UE compares the transmission power of an uplink signal in each CC group corresponding with a maximum transmission power configured for the each CC group by an eNB, compares the sum of transmission powers of uplink signals in all CC groups with the maximum transmission power configured for the UE by the eNB, and performs a power reduction within the CC group when the comparison result meets a intra-group power reduction condition, performs a power reduction between the CC groups when the comparison result meets a inter-group power reduction condition.

In the step, it is assumed that for a subframe i, in CC group 1, there are simultaneously a PUCCH transmission and a PUSCH transmission on CC1, there is only a PUSCH transmission on CC2, and $$P_{PUCCH\ CC1}(i)+P_{PUSCH\ CC1}(i)+P_{PUSCH\ CC2}(i) > P_{PA1\ Max}$$

wherein $P_{PUCCH\ CC1}(i)$ is the PUCCH transmission power on CC1, $P_{PUSCH\ CC1}(i)$ is the PUSCH transmission power on CC1, $P_{PUSCH\ CC2}(i)$ is the PUSCH transmission power on CC2, and $P_{PA1\ Max}$ is the maximum power configured for CC group 1 by the eNB.

While for the same subframe I, in CC group 2, there are simultaneously a PUCCH transmission and a PUSCH transmission on CC3, there is only a PUSCH transmission on CC4, and $$P_{PUCCH\ CC3}(i)+P_{PUSCH\ CC3}(i)+P_{PUSCH\ CC4}(i) < P_{PA2\ Max}$$

wherein $P_{PUCCH\ CC3}(i)$ is the PUCCH transmission power on CC3, $P_{PUSCH\ CC3}(i)$ is the PUSCH transmission power on CC3, $P_{PUSCH\ CC4}$ is the PUSCH transmission power on CC4, and $P_{PA2\ Max}$ is the maximum power configured for CC group 2 by the eNB.

Then in the step, the power reduction is performed in CC group 1 according to a power reduction method in TS 36.213 Release 10, i.e., on the premise of ensuring the $P_{PUCCH\ CC1}$, $P_{PUSCH\ CC1}$, and $P_{PUSCH\ CC2}$ are multiplied by a same power reduction factor W(i), to eventually meet the following formula:

$$\sum_{CC} W(i) \cdot P_{PUSCH\ CC}(i) \leq P_{PA1\ Max} - P_{PUCCH\ CC1}(i)$$

wherein CC represents CC1 and CC2.

If after power reduction, the sum of transmission powers of uplink signals in CC group 1 and CC group 2 is larger than the maximum transmission power configured for the UE by the eNB, i.e., $$W(i) \cdot P_{PUSCH\ CC1}(i)+P_{PUCCH\ CC1}(i)+W(i) \cdot P_{PUSCH\ CC2}(i)+P_{PUSCH}(i)+P_{PUCCH\ CC3}(i)+P_{PUSCH\ CC4}(i) > P_{CMAX}$$

a power reduction using CC group as the unit is performed between the CC groups, comprising:

the transmission powers of the uplink signals in CC group 1 are reduced sequentially by using Way 1 for performing a power reduction using CC group as the unit between the cc groups, i.e., the transmission powers of the uplink signals in CC group 1 are multiplied by a same power reduction factor V(i), to reduce in equal proportion the transmission powers of the uplink signals in CC group 1, to eventually meet the following formula:

$$V(i)\cdot(W(i)\cdot P_{PUSCH\ CC_1}(i)+P_{PUCCH\ CC_1}(i)+\\W(i)\cdot P_{PUSCH\ CC_2}(i))+P_{PUSCH\ CC_3}(i)+\\P_{PUCCH\ CC_2}(i)+P_{PUSCH\ CC_4}(i)\le P_{CMAX}$$

then, the uplink signals are transmitted.

Or, the transmission powers of the uplink signals in CC group 2 are reduced sequentially by using Way 2 for performing a power reduction using CC group as the unit between the cc groups, i.e., the transmission powers of the uplink signals in CC group 2 are multiplied by a same power reduction factor V(i), to reduce in equal proportion the transmission powers of the uplink signals in CC group 2, to eventually meet the following formula:

$$W(i)\cdot P_{PUSCH\ CC_1}(i)+P_{PUCCH\ CC_1}(i)+W(i)\cdot\\P_{PUSCH\ CC_2}(i)+V(i)\cdot P_{PUSCH\ CC_2}(i)+\\P_{PUCCH\ CC_3}(i)+P_{PUSCH\ CC_4}(i)\le P_{CMAX}$$

then, the uplink signals are transmitted.

Third Embodiment

Figure 5:
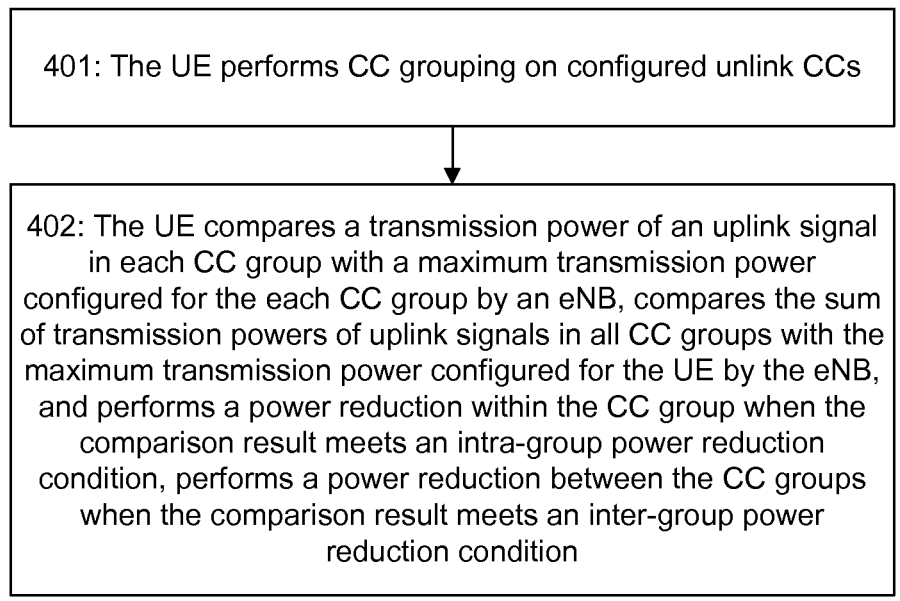
FIG. 5 shows a schematic flow chart for implementing a method for reducing the transmission power of an uplink signal according to a third embodiment of the present disclosure.

It is assumed in the embodiment that a UE configures 4 uplink CCs, i.e., CC1, CC2, CC3 and CC4, and 2 PAs, i.e., PA1 and PA2. A method for reducing the transmission power of an uplink signal is implemented, as shown in FIG. 5, the method comprises the following steps:

Step 401: The UE performs CC grouping on configured unlink CCs.

Specifically, an eNB notifies the UE by a DCI signalling, to classify CC1 and CC2 transmitted by PA1 into CC group 1 and to classify CC3 and CC4 transmitted by PA2 into CC group 2; or the UE classifies CC1 and CC2 transmitted by PA1 into CC group 1 and classifies CC3 and CC4 transmitted by PA2 into CC group 2 according to a pre-defined CC grouping method;

wherein CC1 is a PCell, the CC index of CC1 is 0, the CC index of CC2 is 1, the CC index of CC3 is 2, and the CC index of CC4 is 3.

Step 402: The UE compares the transmission power of an uplink signal in each CC group corresponding with a maximum transmission power configured for the each CC group by an eNB, compares the sum of transmission powers of uplink signals in all CC groups with the maximum transmission power configured for the UE by the eNB, and performs a power reduction within the CC group when the comparison result meets a intra-group power reduction condition, performs a power reduction between the CC groups when the comparison result meets a inter-group power reduction condition.

In the step, it is assumed that there are a PUCCH transmission and a PUSCH transmission on CC1, there is only a PUSCH transmission on CC2, CC3, CC4 and CC5, and $$P_{PUCCH\ CC_1}(i)+P_{PUSCH\ CC_1}(i)+P_{PUSCH\ CC_2}(i)>\\P_{PA1\ Max}$$

$$P_{PUSCH\ CC_2}(i)+P_{PUSCH\ CC_4}(i)+P_{PUSCH\ CC_5}(i)>\\P_{PA2\ Max}$$

Then in the step, the power reduction is performed in CC group 1 according to a power reduction method in TS 36.213 Release 10, which will not be repeated herein. After the power reduction is performed on the uplink signals in CC group 1, the sum of transmission powers of uplink signals in all CC groups is compared with the maximum transmission power $P_{CMAX}$ configured for the UE by the eNB, when the sum of transmission powers of uplink signals in all CC groups is larger than the maximum transmission power configured for the UE by the eNB, i.e., $$W(i)\cdot P_{PUSCH\ CC_1}(i)|P_{PUCCH\ CC_1}(i)|W(i)\cdot\\P_{PUSCH\ CC_2}(i)|P_{PUSCH\ CC_3}(i)+P_{PUSCH\ CC_4}(i)+\\P_{PUSCH\ CC_5}(i)>P_{CMAX}$$

a power reduction using CC group as the unit is performed between the CC groups, comprising:

a minimum CC index of CCs in CC group 1 and CC group 2 are compared, in the embodiment, the minimum CC index of CC group 1 is 0, and the minimum CC index of CC group 2 is 2, therefore CC group 1 is set to a higher priority than that of CC group 2, transmission powers of uplink signals in CC group 2 are reduced with equal proportion by multiplying the transmission power of the uplink signals in CC group 2 by a power reduction factor V(i), to eventually meet the following formula:

$$V(i)\cdot(W(i)\cdot P_{PUSCH\ CC_1}(i)+P_{PUCCH\ CC_1}(i)+\\W(i)\cdot P_{PUCCH\ CC_2}(i)+P_{PUSCH\ CC_3}(i)+\\P_{PUSCH\ CC_4}(i)+P_{PUSCH\ CC_5}(i)\le P_{CMAX}$$

then, the uplink signals are transmitted;

or, a maximum CC index of CCs in CC group 1 and CC group 2 are compared, in the embodiment, the maximum CC index of CC group 1 is 1, and the maximum CC index of CC group 2 is 3, therefore CC group 2 is set to a higher priority than that of CC group 1, transmission powers of uplink signals in CC group 1 are reduced with equal proportion by multiplying the transmission power of the uplink signals in CC group 1 by a power reduction factor V(i), to eventually meet the following formula:

$$V(i)\cdot(W(i)\cdot P_{PUSCH\ CC_1}(i)+P_{PUCCH\ CC_1}(i)+\\W(i)\cdot P_{PUSCH\ CC_2}(i)+P_{PUSCH\ CC_3}(i)+\\P_{PUSCH\ CC_4}(i)+P_{PUSCH\ CC_5}(i)\le P_{CMAX}$$

then, the uplink signals are transmitted;

or, since CC1 is a PCell in the embodiment, CC group 1 is set to a higher priority than that of CC group 2, transmission powers of uplink signals in CC group 2 are reduced with equal proportion by multiplying the transmission power of the uplink signals in CC group 2 by a power reduction factor V(i), to eventually meet the following formula:

$$W(i)\cdot P_{PUSCH\ CC_1}(i)+P_{PUCCH\ CC_1}(i)+W(i)\cdot\\P_{PUSCH\ CC_2}(i)+V(i)\cdot(P_{PUSCH\ CC_3}(i)+P_{PUSCH\ CC_4}\\(i)+P_{PUSCH\ CC_5}(i)\le P_{CMAX}$$

then, the uplink signals are transmitted;

or, the quantity of CCs in CC group 1 and CC group 2 are compared, in the embodiment, CC group 1 includes 2 CCs, and CC group 2 includes 3 CCs, therefore CC group 2 is set to a higher priority than that of CC group 1, transmission powers of uplink signals in CC group 1 are reduced with equal proportion by multiplying the transmission power of the uplink signals in CC group 1 by a power reduction factor V(i), to eventually meet the following formula:

$$V(i)\cdot(W(i)\cdot P_{PUSCH\ CC_1}(i)+P_{PUCCH\ CC_1}(i)+\\W(i)\cdot P_{PUCCH\ CC_2}(i))+P_{PUSCH\ CC_3}(i)+\\P_{PUSCH\ CC_4}(i)+P_{PUSCH\ CC_5}(i)\le P_{CMAX}$$

then, the uplink signals are transmitted;

or, since there is a PUCCH transmission in CC group 1 while there is no one in CC group 2, CC group 1 is set to a higher priority than that of CC group 2, transmission powers of uplink signals in CC group 2 are reduced with equal proportion by multiplying the transmission power of the uplink signals in CC group 2 by a power reduction factor V(i), to eventually meet the following formula:

$$W(i)\cdot P_{PUSCH\ CC_1}(i)+P_{PUCCH\ CC_1}(i)+W(i)\cdot\\P_{PUSCH\ CC_2}(i)+V(i)\cdot(P_{PUSCH\ CC_3}(i)+\\P_{PUCCH\ CC_4}(i)+P_{PUSCH\ CC_5}(i))\le P_{CMAX}$$

then, the uplink signals are transmitted.

Fourth Embodiment

Figure 6:
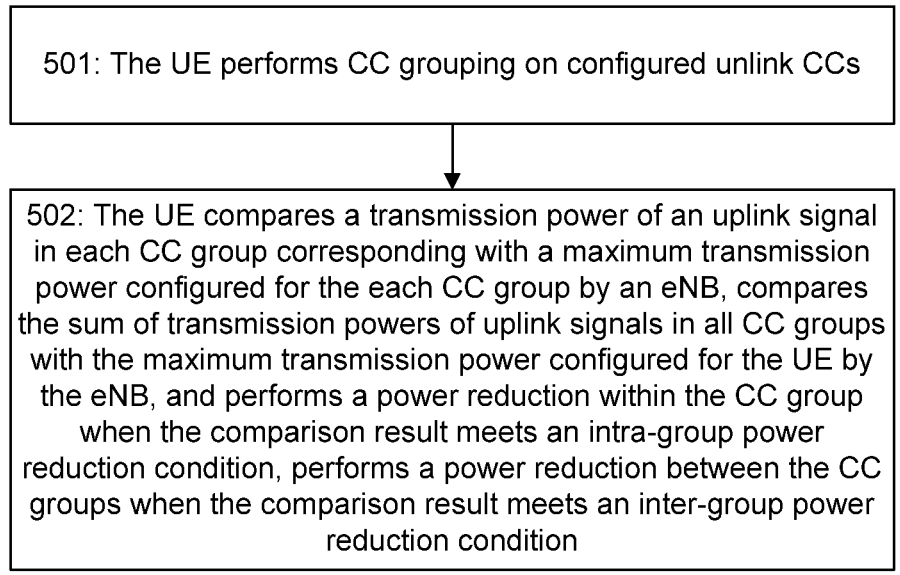
FIG. 6 shows a schematic flow chart for implementing a method for reducing the transmission power of an uplink signal according to a fourth embodiment of the present disclosure.

It is assumed in the embodiment that a UE configures 5 uplink CCs, i.e., CC1, CC2, CC3, CC4 and CC5, and 3 PAs, i.e., PA1, PA2 and PA3. A method for reducing the transmission power of an uplink signal is implemented, as shown in FIG. 6, the method comprises the following steps:

Step 501: The UE performs CC grouping on configured unlink CCs.

Specifically, an eNB notifies the UE by a DCI signalling, to classify CC1 and CC2 transmitted by PA1 into CC group 1, to classify CC3 and CC4 transmitted by PA2 into CC group 2, and to classify CC5 transmitted by PA3 into CC group 3; or the UE classifies CC1 and CC2 transmitted by PA1 into CC group 1, classifies CC3 and CC4 transmitted by PA2 into CC group 2, and classifies CC5 transmitted by PA3 into CC group 3 according to a pre-defined CC grouping method;

wherein CC1 is a PCell, then the CC index of CC1 is 0, the CC index of CC2 is 1, the CC index of CC3 is 2, the CC index of CC4 is 3, and the CC index of CC5 is 4.

Step 502: The UE compares the transmission power of an uplink signal in each CC group corresponding with a maximum transmission power configured for the each CC group by an eNB, compares the sum of transmission powers of uplink signals in all CC groups with the maximum transmission power configured for the UE by the eNB, and performs a power reduction within the CC group when the comparison result meets a intra-group power reduction condition, performs a power reduction between the CC groups when the comparison result meets a inter-group power reduction condition.

In the step, it is assumed that there are a PUCCH transmission and a PUSCH transmission on CC1 and CC5, there is only a PUSCH transmission on CC2, CC3 and CC4, and $$P_{PUCCH\ CC1}(i)|P_{PUSCH\ CC1}|P_{PUSCH\ CC2}(i) > P_{PA1\ Max}$$

$$P_{PUCCH\ CC3}(i)|P_{PUSCH\ CC4} > P_{PA1\ Max}$$

$$P_{PUCCH\ CC5}(i)|P_{PUSCH\ CC5} > P_{PA3\ Max}$$

Then in the step, the power reduction is performed in CC group 1 according to a power reduction method in TS 36.213 Release 10, which will not be repeated herein. After the power reduction is performed on the uplink signals in CC group 1, the sum of transmission powers of uplink signals in all CC groups is compared with the maximum transmission power $P_{CMAX}$ configured for the UE by the eNB, when the sum of transmission powers of uplink signals in all CC groups is larger than the maximum transmission power configured for the UE by the eNB, i.e., $$W(i) \cdot P_{PUSCH\ CC1}(i) + P_{PUCCH\ CC1}(i) + W(i) \cdot P_{PUSCH\ CC2}(i) + (P_{PUSCH\ CC2}(i) + P_{PUCCH\ CC4}(i) + P_{PUSCH\ CC5}(i) + P_{PUSCH\ CC5}(i) > P_{CMAX}$$

a power reduction using CC group as the unit is performed between the CC groups, comprising:

since CC group 1 includes a PCell, CC group 1 is set as a priority group having a high priority, and CC group 2 and CC group 3 don't include a PCell, therefore CC group 2 and CC group 3 are set as a priority group having a low priority, transmission powers of uplink signals in CC group 2 and CC group 3 are reduced with equal proportion by multiplying the transmission powers of the uplink signals in CC group 2 and CC group 3 by a power reduction factor V(i), to eventually meet the following formula:

$$W(i) \cdot P_{PUSCH\ CC1}(i) + P_{PUCCH\ CC1}(i) + W(i) \cdot P_{PUSCH\ CC2}(i) + V(i) \cdot (P_{PUSCH\ CC3}(i) + P_{PUCCH\ CC4}(i) + P_{PUSCH\ CC5}(i) + P_{PUSCH\ CC5}(i) \leq P_{CMAX}$$

then, the uplink signals are transmitted;

or, since CC group 1 and CC group 2 consist of 2 CCs, and CC group 3 consists of 1 CC, CC group 1 and CC group 2 are set as a same priority group having a higher priority, and CC group 3 is set as a priority group having a lower priority, transmission powers of uplink signals in CC group 3 are reduced with equal proportion by multiplying the transmission powers of uplink signals in CC group 3 by a power reduction factor V(i), to eventually meet the following formula:

$$W(i) \cdot P_{PUSCH\ CC1}(i) + P_{PUCCH\ CC1}(i) + W(i) \cdot P_{PUSCH\ CC2}(i) + P_{PUSCH\ CC3}(i) + P_{PUCCH\ CC4}(i) + V(i) \cdot (P_{PUSCH\ CC5}(i) + P_{PUSCH\ CC5}(i)) \leq P_{CMAX}$$

then, the uplink signals are transmitted;

or, since uplink signals in CC group 1 and CC group 3 include a PUCCH, and uplink signals in CC group 2 include only a PUSCH, CC group 1 and CC group 3 are set as a same priority group having a higher priority, and CC group 3 is set as a priority group having a lower priority, the transmission powers of uplink signals in CC group 2 are reduced with equal proportion by multiplying the transmission powers of uplink signals in CC group 2 by a power reduction factor V(i), to eventually meet the following formula:

$$W(i) \cdot P_{PUSCH\ CC1}(i) + P_{PUCCH\ CC1}(i) + W(i) \cdot P_{PUSCH\ CC2}(i) + V(i) \cdot (P_{PUSCH\ CC3}(i) + P_{PUSCH\ CC4}(i)) + P_{PUSCH\ CC5}(i) + P_{PUSCH\ CC5}(i) \leq P_{CMAX}$$

then, the uplink signals are transmitted.

Fifth Embodiment

Figure 7:
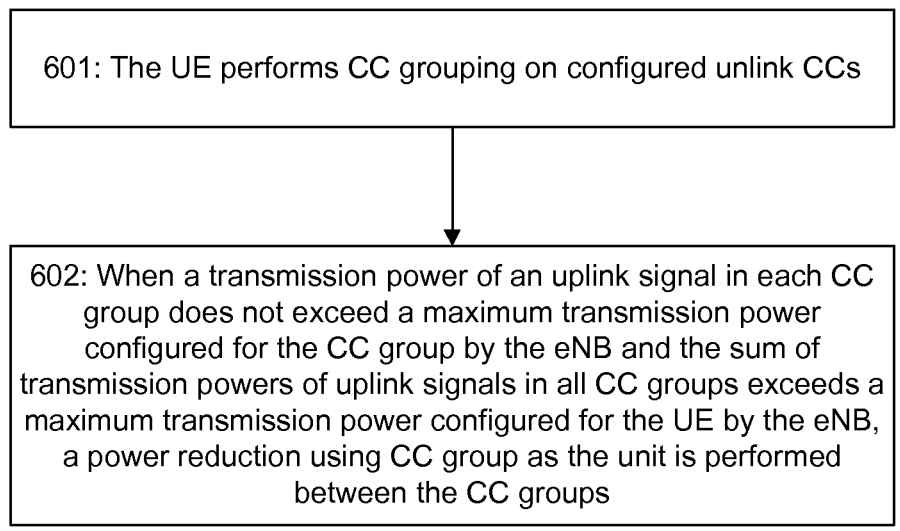
FIG. 7 shows a schematic flow chart for implementing a method for reducing the transmission power of an uplink signal according to a fifth embodiment of the present disclosure.

It is assumed in the embodiment that a UE configures 3 uplink CCs, i.e., CC1, CC2 and CC3, wherein CC1 is a PCell and the CC index of CC1 is 0, the CC index of CC2 is 1, and the CC index of CC3 is 2; the UE configures 3 PAs, i.e., PA1, PA2 and PA3. A method for reducing the transmission power of an uplink signal is implemented, as shown in FIG. 7, the method comprises the following steps:

Step 601: The UE performs CC grouping on configured unlink CCs.

Specifically, an eNB notifies the UE by a DCI signalling, to classify CC1 transmitted by PA1 into CC group 1, to classify CC2 transmitted by PA2 into CC group 2, and to classify CC3 transmitted by PA3 into CC group 3; or the UE classifies CC1 transmitted by PA1 into CC group 1, classifies CC2 transmitted by PA2 into CC group 2, and classifies CC3 transmitted by PA3 into CC group 3 according to a pre-defined CC grouping method;

Step 602: When the transmission power of an uplink signal in each CC group does not exceed a maximum transmission power configured for the CC group by the eNB and the sum of transmission powers of uplink signals in all CC groups exceeds a maximum transmission power configured for the UE by the eNB, a power reduction using CC group as the unit is performed between the CC groups.

In the step, there is a PUCCH transmission on CC1, CC2 and CC3, and $$P_{PUSCH\ CC1}(i) < P_{PA1\ Max}$$

$$P_{PUSCH\ CC2}(i) < P_{PA2\ Max}$$

$$P_{PUSCH\ CC3}(i) < P_{PA3\ Max}$$

then, there is no need to perform a power reduction within respective CC groups, the sum of transmission powers of uplink signals in all CC groups is compared with the maximum transmission power configured for the UE by the eNB, it is assumed that the sum of the transmission powers of the uplink signals in all CC groups is larger than the maximum transmission power $P_{CMAX}$ configured for the UE by the eNB, i.e., $P_{PUCCH\ CC1}(i) + P_{PUCCH\ CC2}(i) + P_{PUCCH\ CC3}(i) > P_{CMAX}$ the transmission powers of the uplink signals in CC group 1, CC group 2 and CC group 3 are multiplies with a power reduction factor V(i), to reduce with equal proportion the transmission powers of the uplink signals in CC group 1, CC group 2 and CC group 3, to eventually meet the following formula:

$V(i) \cdot (P_{PUCCH\ CC1}(i) + P_{PUCCH\ CC2}(i) + P_{PUCCH\ CC3}(i)) < P_{CMAX}$ then, the uplink signals are transmitted.

Sixth Embodiment

Figure 8:
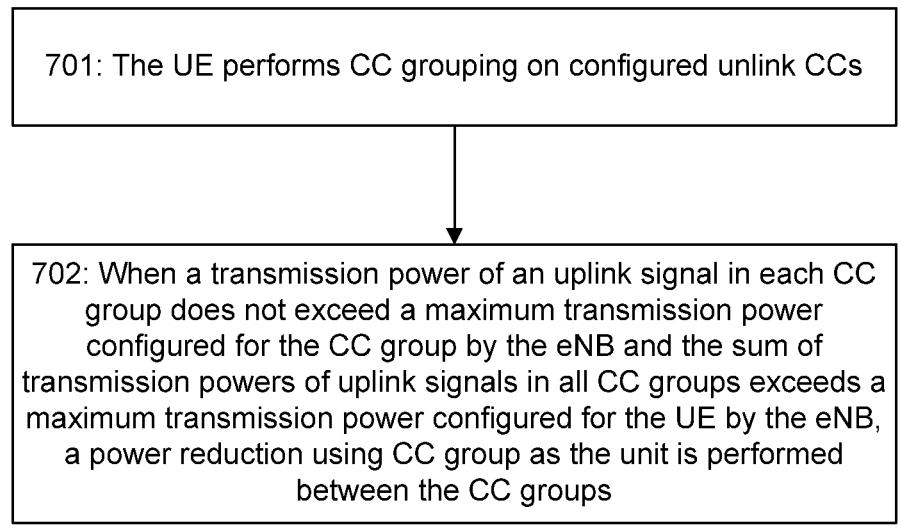
FIG. 8 shows a schematic flow chart for implementing a method for reducing the transmission power of an uplink signal according to a sixth embodiment of the present disclosure.

It is assumed in the embodiment that a UE configures 3 uplink CCs, i.e., CC1, CC2 and CC3, wherein CC1 is a PCell and the CC index of CC1 is 0, the CC index of CC2 is 1, and the CC index of CC3 is 2. The UE configures 3 PAs, i.e., PA1, PA2 and PA3. A method for reducing the transmission power of an uplink signal is implemented, as shown in FIG. 8, the method comprises the following steps:

Step 701: The UE performs CC grouping on configured unlink CCs.

Specifically, an eNB notifies the UE by a DCI signalling, to classify CC1 transmitted by PA1 into CC group 1, to classify CC2 transmitted by PA2 into CC group 2, and to classify CC3 transmitted by PA3 into CC group 3; or the UE classifies CC1 transmitted by PA1 into CC group 1, classifies CC2 transmitted by PA2 into CC group 2, and classifies CC3 transmitted by PA3 into CC group 3 according to a pre-defined CC grouping method;

Step 702: When the transmission power of an uplink signal in each CC group does not exceed a maximum transmission power configured for the CC group by the eNB and the sum of transmission powers of uplink signals in all CC groups exceeds a maximum transmission power configured for the UE by the eNB, a power reduction using CC group as the unit is performed between the CC groups.

In the step, there is a PUCCH transmission on CC1, CC2 and CC3, and $P_{PUCCH\ CC1}(i) < P_{PA1\ Max}$ $P_{PUCCH\ CC2}(i) < P_{PA2\ Max}$ $P_{PUCCH\ CC3}(i) < P_{PA3\ Max}$ then, there is no need to perform a power reduction within respective CC groups, the sum of transmission powers of uplink signals in all CC groups is compared with the maximum transmission power configured for the UE by the eNB, it is assumed that the sum of the transmission powers of the uplink signals in all CC groups is larger than the maximum transmission power configured for the UE by the eNB, i.e., $P_{PUCCH\ CC1}(i) + P_{PUCCH\ CC2}(i) + P_{PUCCH\ CC3}(i) > P_{CMAX}$ then a power reduction using CC group as the unit is performed between the CC groups, comprising:

a minimum CC index of CCs in CC group 1, CC group 2 and CC group 3 are compared, in the embodiment, the minimum CC index of CC group 1 is 0, the minimum CC index of CC group 2 is 1, and the minimum CC index of CC group 3 is 2, therefore CC group 1 is set to a higher priority than that of CC group 2, and CC group 2 is set to a higher priority than that of CC group 3, transmission powers of uplink signals in CC group 3 are reduced with equal proportion by multiplying the transmission power of the uplink signals in CC group 3 by a power reduction factor V(i), to eventually meet the following formula:

$P_{PUCCH\ CC1}(i) + P_{PUCCH\ CC2}(i) + V(i) \cdot P_{PUCCH\ CC3}(i) \le P_{CMAX}$ then, the uplink signals are transmitted;

or, a maximum CC index of CCs in CC group 1, CC group 2 and CC group 3 are compared, in the embodiment, the maximum CC index of CC group 1 is 0, the maximum CC index of CC group 2 is 1, and the maximum CC index of CC group 3 is 2, therefore CC group 3 is set to a higher priority than that of CC group 2, and CC group 2 is set to a higher priority than that of CC group 1, transmission powers of uplink signals in CC group 1 are reduced with equal proportion by multiplying the transmission power of the uplink signals in CC group 1 by a power reduction factor V(i), to eventually meet the following formula:

$V(i) \cdot P_{PUCCH\ CC1}(i) + P_{PUCCH\ CC2}(i) + P_{PUCCH\ CC3}(i) \le P_{CMAX}$ then, the uplink signals are transmitted;

or, since CC1 is a PCell in the embodiment, CC group 1 is set to a higher priority than those of CC group 2 and CC group 3, then a minimum CC index of CCs in CC group 2 and CC group 3 are compared, the minimum CC index of CC group 2 is 1, and the minimum CC index of CC group 3 is 2, therefore CC group 2 is set to a higher priority than that of CC group 3, the transmission power of an uplink signal in CC group 3 is reduced with equal proportion by multiplying the transmission power of the uplink signal in CC group 3 by a power reduction factor V(i), to eventually meet the following formula:

$P_{PUCCH\ CC1}(i) + P_{PUCCH\ CC2}(i) + V(i) \cdot P_{PUCCH\ CC3}(i) \le P_{CMAX}$ then, the uplink signals are transmitted;

or, in the embodiment, since CC group 1, CC group 2 and CC group 3 all include 1 CC, priorities can't be determined, then a minimum CC index of CCs in CC group 1, CC group 2 and CC group 3 are compared, the minimum CC index of CC group 1 is 0, the minimum CC index of CC group 2 is 1, and the minimum CC index of CC group 3 is 2, therefore CC group 1 is set to a higher priority than that of CC group 2, CC group 2 is set to a higher priority than that of CC group 3, the transmission power of an uplink signal in CC group 3 is reduced with equal proportion by multiplying the transmission power of the uplink signal in CC group 3 by a power reduction factor V(i), to eventually meet the following formula:

$P_{PUCCH\ CC1}(i) + P_{PUCCH\ CC2}(i) + V(i) \cdot P_{PUCCH\ CC3}(i) \le P_{CMAX}$ then, the uplink signals are transmitted;

or, in the embodiment, since CC group 1, CC group 2 and CC group 3 all include a PUCCH, priorities can't be determined, then a minimum CC index of CCs in CC group 1, CC group 2 and CC group 3 are compared, the minimum CC index of CC group 1 is 0, the minimum CC index of CC group 2 is 1, and the minimum CC index of CC group 3 is 2, therefore CC group 1 is set to a higher priority than that of CC group 2, CC group 2 is set to a higher priority than that of CC group 3, the transmission power of an uplink signal in CC group 3 is reduced with equal proportion by multiplying the transmission power of the uplink signal in CC group 3 by a power reduction factor V(i), to eventually meet the following formula:

$$P_{PUCCH\ CC1}(i)+P_{PUCCH\ CC2}(i)+V(i)\cdot P_{PUCCH\ CC3}(i) \leq P_{CMAX}$$

then, the uplink signals are transmitted;

Seventh Embodiment

Figure 9:
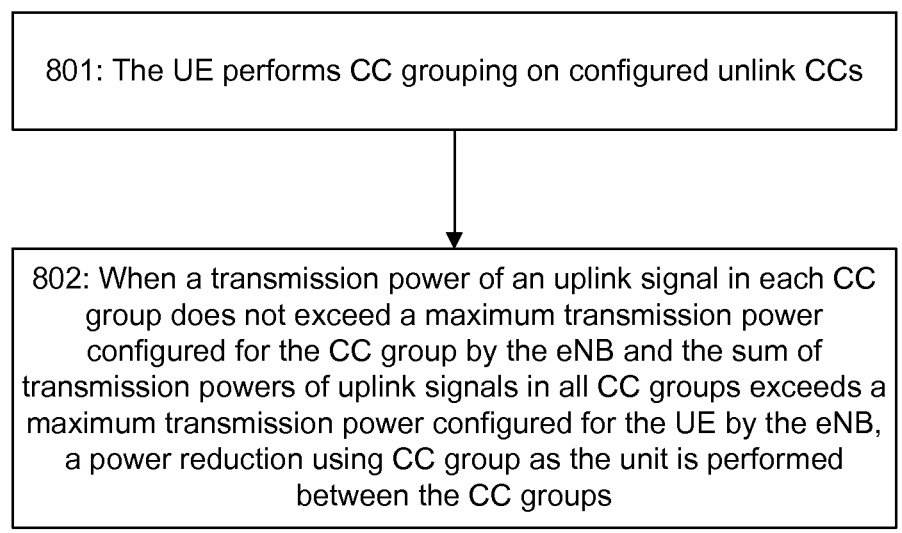
FIG. 9 shows a schematic flow chart for implementing a method for reducing the transmission power of an uplink signal according to a seventh embodiment of the present disclosure.

It is assumed in the embodiment that a UE configures 3 uplink CCs, i.e., CC1, CC2 and CC3, wherein CC1 is a PCell and the CC index of CC1 is 0, the CC index of CC2 is 1, and the CC index of CC3 is 2. The UE configures 3 PAs, i.e., PA1, PA2 and PA3. A method for reducing the transmission power of an uplink signal is implemented, as shown in FIG. 9, the method comprises the following steps:

Step 801: The UE performs CC grouping on configured unlink CCs.

Specifically, an eNB notifies the UE by a DCI signalling, to classify CC1 transmitted by PA1 into CC group 1, to classify CC2 transmitted by PA2 into CC group 2, and to classify CC3 transmitted by PA3 into CC group 3; or the UE classifies CC1 transmitted by PA1 into CC group 1, classifies CC2 transmitted by PA2 into CC group 2, and classifies CC3 transmitted by PA3 into CC group 3 according to a pre-defined CC grouping method;

Step 802: When the transmission power of an uplink signal in each CC group does not exceed a maximum transmission power configured for the CC group by the eNB and the sum of transmission powers of uplink signals in all CC groups exceeds a maximum transmission power configured for the UE by the eNB, a power reduction using CC group as the unit is performed between the CC groups.

In the step, there is a PUCCH transmission on CC1, CC2 and CC3, and $$P_{PUSCH\ CC1}(i)<P_{PA1\ Max}$$

$$P_{PUSCH\ CC2}(i)<P_{PA2\ Max}$$

$$P_{PUSCH\ CC3}(i)<P_{PA3\ Max}$$

then, there is no need to perform a power reduction within respective CC groups, the sum of transmission powers of uplink signals in all CC groups is compared with the maximum transmission power configured for the UE by the eNB, it is assumed that the sum of the transmission powers of the uplink signals in all CC groups is larger than the maximum transmission power configured for the UE by the eNB, i.e., $$P_{PUCCH\ CC1}(i)+P_{PUCCH\ CC2}(i)+P_{PUCCH\ CC3}(i) > P_{CMAX}$$

then a power reduction using CC group as the unit is performed between the CC groups, comprising:

in the embodiment, since CC1 in CC group 1 is a PCell, CC group 1 is set as a priority group having a high priority, and CC group 2 and CC group 3 are set as a same priority group having a low priority, transmission powers of uplink signals in CC group 2 and CC group 3 are reduced with equal proportion by multiplying the transmission power of the uplink signals in CC group 2 and CC group 3 by a power reduction factor V(i), to eventually meet the following formula:

$$P_{PUCCH\ CC1}(i)+V(i)\cdot(P_{PUCCH\ CC2}(i)+P_{PUCCH\ CC3}(i)) \leq P_{CMAX}$$

then, the uplink signals are transmitted;

or, in the embodiment, since CC group 1, CC group 2 and CC group 3 all include 1 CC, CC group 1, CC group 2 and CC group 3 are set to a same priority, transmission powers of uplink signals in CC group 1, CC group 2 and CC group 3 are reduced with equal proportion by multiplying the transmission powers of the uplink signals in CC group 1, CC group 2 and CC group 3 with a power reduction factor V(i), to eventually meet the following formula:

$$V(i)\cdot(P_{PUCCH\ CC1}(i)+P_{PUCCH\ CC2}(i)+P_{PUCCH\ CC3}(i)) \leq P_{CMAX}$$

then, the uplink signals are transmitted;

or, in the embodiment, since CC group 1, CC group 2 and CC group 3 all include a PUCCH, CC group 1, CC group 2 and CC group 3 are set to a same priority, transmission powers of uplink signals in CC group 1, CC group 2 and CC group 3 are reduced with equal proportion by multiplying the transmission powers of the uplink signals in CC group 1, CC group 2 and CC group 3 with a power reduction factor V(i), to eventually meet the following formula:

$$V(i)\cdot(P_{PUCCH\ CC1}(i)+P_{PUCCH\ CC2}(i)+P_{PUCCH\ CC3}(i)) \leq P_{CMAX}$$

then, the uplink signals are transmitted.

Eighth Embodiment

Figure 10:
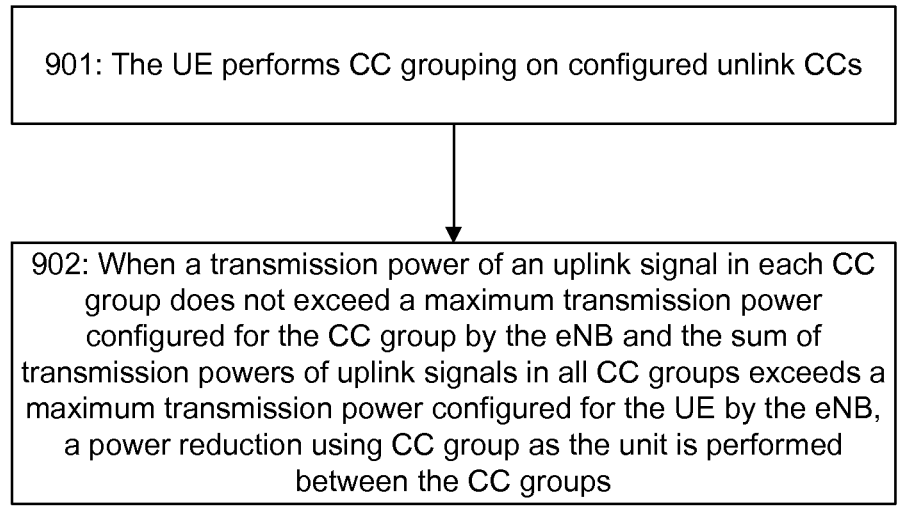
FIG. 10 shows a schematic flow chart for implementing a method for reducing the transmission power of an uplink signal according to a eighth embodiment of the present disclosure.

It is assumed in the embodiment that a UE configures 3 uplink CCs, i.e., CC1, CC2 and CC3, wherein CC1 is a PCell and the CC index of CC1 is 0, the CC index of CC2 is 1, and the CC index of CC3 is 2. The UE configures 3 PAs, i.e., PA1, PA2 and PA3. A method for reducing the transmission power of an uplink signal is implemented, as shown in FIG. 10, the method comprises the following steps:

Step 901: The UE performs CC grouping on configured unlink CCs.

Specifically, an eNB notifies the UE by a DCI signalling, to classify CC1 transmitted by PA1 into CC group 1, to classify CC2 transmitted by PA2 into CC group 2, and to classify CC3 transmitted by PA3 into CC group 3; or the UE classifies CC1 transmitted by PA1 into CC group 1, classifies CC2 transmitted by PA2 into CC group 2, and classifies CC3 transmitted by PA3 into CC group 3 according to a pre-defined CC grouping method;

Step 902: When the transmission power of an uplink signal in each CC group does not exceed a maximum transmission power configured for the CC group by the eNB and the sum of transmission powers of uplink signals in all CC groups exceeds a maximum transmission power configured for the UE by the eNB, a power reduction using CC group as the unit is performed between the CC groups.

In the step, a SRS is transmitted on CC1, CC2 and CC 3, wherein an A-SRS is transmitted on CC2, a P-SRS is transmitted on CC1 and CC3, and the P-SRS bandwidth on CC1 is larger than that on CC3, the P-SRS period on CC1 is larger than that on CC3, and $$P_{SRS\ CC1}(i)<P_{PA1\ Max}$$

$$P_{SRS\ CC2}(i)<P_{PA2\ Max}$$

$$P_{SRS\ CC3}(i)<P_{PA3\ Max}$$

wherein $P_{SRS\ CC1}(i)$ is the transmission power of SRS on CC1, $P_{SRS\ CC2}(i)$ is the transmission power of SRS on CC2, $P_{SRS\ CC2}(i)$ is the transmission power of SRS on CC3, $P_{PA1\ Max}$ is the maximum transmission power configured for CC1 by the eNB, $P_{PA2\ Max}$ is the maximum transmission power configured for CC2 by the eNB, and $P_{PA3\ Max}$ is the maximum transmission power configured for CC3 by the eNB.

Then there is no need to perform a power reduction within respective CC groups, the sum of transmission powers of uplink signals in all CC groups is compared with the maximum transmission power configured for the UE by the eNB, it is assumed that the sum of the transmission powers of the uplink signals in all CC groups is larger than the maximum transmission power configured for the UE by the eNB, i.e., $$P_{SRS\ CC1}(i)+P_{SRS\ CC2}(i)+P_{SRS\ CC3}(i)>P_{CMAX}$$

wherein $P_{CMAX}$ is the maximum transmission power configured for the UE by the eNB.

Then a power reduction using CC group as the unit is performed between the CC groups, comprising:

since the A-SRS is transmitted on CC group 2, CC group 2 is set to the highest priority, and since the minimum CC index in CC group 1 is 0, the minimum CC index in CC group 3 is 2, CC group 1 is set to a lower priority than that of CC group 2, and CC group 3 is set to the lowest priority, transmission powers of uplink signals in CC group 3 are reduced with equal proportion by multiplying the transmission powers of the uplink signals in CC group 3 having the lowest priority by a power reduction factor V(i), to eventually meet the following formula:

$$P_{SRS\ CC1}(i)+P_{SRS\ CC2}(i)+V(i)\cdot P_{SRS\ CC3}(i)\leq P_{CMAX}$$

then, the uplink signals are transmitted;

or, since the A-SRS is transmitted on CC group 2, CC group 2 is set to the highest priority, and since the P-SRS period in CC group 1 is larger than that of CC group 3, CC group 3 is set to a lower priority than that of CC group 2, and CC group 1 is set to the lowest priority, transmission powers of uplink signals in CC group 1 are reduced with equal proportion by multiplying the transmission powers of the uplink signals in CC group 1 having the lowest priority by a power reduction factor V(i), to eventually meet the following formula:

$$V(i)\cdot P_{SRS\ CC1}(i)+P_{SRS\ CC2}(i)+P_{SRS\ CC3}(i)\leq P_{CMAX}$$

then, the uplink signals are transmitted;

or, since the A-SRS is transmitted on CC group 2, CC group 2 is set to the highest priority, and since CC1 in CC group 1 is a PCell, CC group 1 is set to a lower priority than that of CC group 2, and CC group 3 is set to the lowest priority, transmission powers of uplink signals in CC group 3 are reduced with equal proportion by multiplying the transmission powers of the uplink signals in CC group 3 having the lowest priority by a power reduction factor V(i), to eventually meet the following formula:

$$P_{SRS\ CC1}(i)+P_{SRS\ CC2}(i)+V(i)\cdot P_{SRS\ CC3}(i)\leq P_{CMAX}$$

then, the uplink signals are transmitted;

or, since the A-SRS is transmitted on CC group 2, CC group 2 is set to the highest priority, and since the P-SRS bandwidth in CC group 1 is larger than that of CC group 3, CC group 1 is set to a lower priority than that of CC group 2, and CC group 3 is set to the lowest priority, transmission powers of uplink signals in CC group 3 are reduced with equal proportion by multiplying the transmission powers of the uplink signals in CC group 3 having the lowest priority by a power reduction factor V(i), to eventually meet the following formula:

$$P_{SRS\ CC1}(i)+P_{SRS\ CC2}(i)+V(i)\cdot P_{SRS\ CC3}(i)\leq P_{CMAX}$$

then, the uplink signals are transmitted.

Ninth Embodiment

Figure 11:
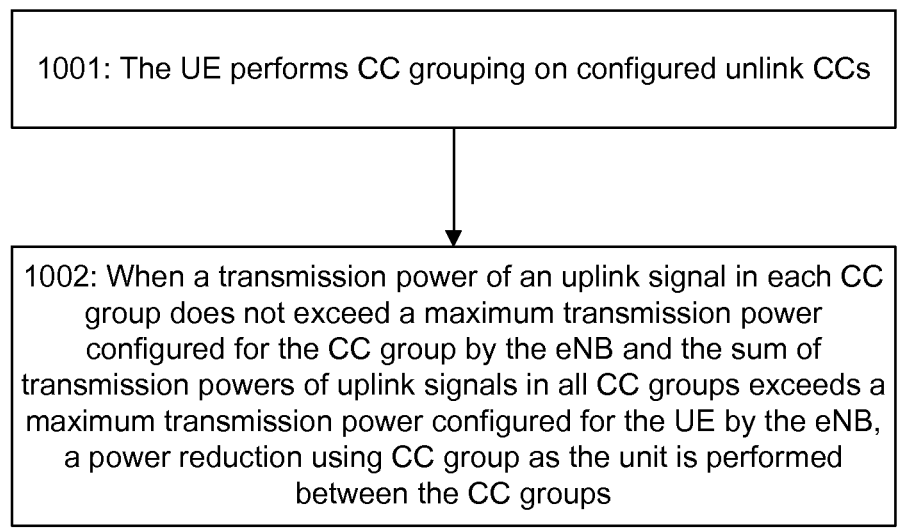
FIG. 11 shows a schematic flow chart for implementing a method for reducing the transmission power of an uplink signal according to a ninth embodiment of the present disclosure.

It is assumed in the embodiment that a UE configures 3 uplink CCs, i.e., CC1, CC2 and CC3, wherein CC1 is a PCell and the CC index of CC1 is 0, the CC index of CC2 is 1, and the CC index of CC3 is 2. The UE configures 3 PAs, i.e., PA1, PA2 and PA3. A method for reducing the transmission power of an uplink signal is implemented, as shown in FIG. 11, the method comprises the following steps:

Step 1001: The UE performs CC grouping on configured unlink CCs.

Specifically, an eNB notifies the UE by a DCI signalling, to classify CC1 transmitted by PA1 into CC group 1, to classify CC2 transmitted by PA2 into CC group 2, and to classify CC3 transmitted by PA3 into CC group 3; or the UE classifies CC1 transmitted by PA1 into CC group 1, classifies CC2 transmitted by PA2 into CC group 2, and classifies CC3 transmitted by PA3 into CC group 3 according to a pre-defined CC grouping method;

Step 1002: When the transmission power of an uplink signal in each CC group does not exceed a maximum transmission power configured for the CC group by the eNB and the sum of transmission powers of uplink signals in all CC groups exceeds a maximum transmission power configured for the UE by the eNB, a power reduction using CC group as the unit is performed between the CC groups.

In the step, a SRS is transmitted on CC1, CC2 and CC 3, wherein an A-SRS is transmitted on CC2, a P-SRS is transmitted on CC1 and CC3, and $$P_{SRS\ CC1}(i)<P_{PA1\ Max}$$

$$P_{SRS\ CC2}(i)<P_{PA2\ Max}$$

$$P_{SRS\ CC3}(i)<P_{PA3\ Max}$$

Then there is no need to perform a power reduction within respective CC groups, the sum of transmission powers of uplink signals in all CC groups is compared with the maximum transmission power configured for the UE by the eNB, it is assumed that the sum of the transmission powers of the uplink signals in all CC groups is larger than the maximum transmission power configured for the UE by the eNB, i.e., $$P_{SRS\ CC1}(i)+P_{SRS\ CC2}(i)+P_{SRS\ CC3}(i)>P_{CMAX}$$

Then a power reduction using CC group as the unit is performed between the CC groups, comprising:

since an A-SRS is transmitted in CC group 2, CC group 2 is set as a priority group having a high priority, and a P-SRS is transmitted in CC group 1 and CC group 3, therefore CC group 1 and CC group 3 are set as a same priority group having a low priority, transmission powers of uplink signals in CC group 1 and CC group 3 are reduced with equal proportion by multiplying the transmission powers of the uplink signals in CC group 1 and CC group 3 by a power reduction factor V(i), to eventually meet the following formula:

$$V(i)\cdot P_{SRS\ CC1}(i)+P_{SRS\ CC2}(i)+V(i)\cdot P_{SRS\ CC3}(i)\leq P_{CMAX}$$

then, the uplink signals are transmitted;

or, since the A-SRS is transmitted in CC group 2, CC group 2 is set as a priority group having the highest priority, and since CC1 in CC group 1 is a PCell, CC group 1 is set as a priority group having a second highest priority, CC group 3 is set as a priority group having the lowest priority, transmission powers of uplink signals in CC group 3 are reduced with equal proportion by multiplying the transmission powers of the uplink signals in CC group 3 by a power reduction factor V(i), to eventually meet the following formula:

$$P_{SRS\ CC1}(i)+P_{SRS\ CC2}(i)+V(i)\cdot P_{SRS\ CC3}(i)\leq P_{CMAX}$$

then, the uplink signals are transmitted.

The above are merely the preferred embodiments of the present disclosure, and are not intended to limit the scope of protection of the claims of the present disclosure.

The invention claimed is:

1. A method for reducing the transmission power of an uplink signal, comprising:
performing, by a User Equipment (UE), Component Carrier (CC) grouping on configured uplink CCs;
comparing the transmission power of an uplink signal in each CC group with a maximum transmission power configured for each CC group by an evolved Node B (eNB), and performing a power reduction within the CC group when the comparison result meets an intra-group power reduction condition; and/or comparing the sum of transmission powers of uplink signals in all CC groups with a maximum transmission power configured for the UE by the eNB, when the comparison result meets an inter-group power reduction condition, and performing a power reduction between the CC groups;
wherein the step of performing a power reduction within the CC group comprises at least one of:
when an uplink signal in a CC group exceeding a maximum transmission power configured for the CC group by an eNB includes Physical Uplink Shared Channels (PUSCHs) and Physical Uplink Control Channels (PUCCHs) transmitted simultaneously, multiplying transmission powers of all PUSCHs by a same power reduction coefficient to reduce the transmission powers of all the PUSCHs with an equal proportion, until that the transmission power of the uplink signal in the CC group does not exceed the maximum transmission power configured for the CC group by the eNB;
when the uplink signal in the CC group exceeding the maximum transmission power configured for the CC group by the eNB includes PUSCHs and PUCCHs, and a part of the PUSCHs carry Uplink Control Information (UCI), while other PUSCHs carry only user data, multiplying transmission powers of all the PUSCHs carrying only user data by the same power reduction coefficient to reduce the transmission powers of all the PUSCHs carrying only user data with an equal proportion, until that the transmission power of the uplink signal in the CC group does not exceed the maximum transmission power configured for the CC group by the eNB;
when the uplink signal in the CC group exceeding the maximum transmission power configured for the CC group by the eNB includes more than one PUSCHs, and a part of these PUSCHs carry UCI, while other PUSCHs carry only user data, multiplying transmission powers of all the PUSCHs carrying only user data by the same power reduction coefficient to reduce the transmission powers of all the PUSCHs carrying only user data with an equal proportion, until that the transmission power of the uplink signal in the CC group does not exceed the maximum transmission power configured for the CC group by the eNB;
when the uplink signal in the CC group exceeding the maximum transmission power configured for the CC group by the eNB includes more than one PUSCHs carrying only user data, multiplying transmission powers of all the PUSCHs by the same power reduction coefficient to reduce the transmission powers of all the PUSCHs with an equal proportion, until that the transmission power of the uplink signal in the CC group does not exceed the maximum transmission power configured for the CC group by the eNB; and
when the uplink signal in the CC group exceeding the maximum transmission power configured for the CC group by the eNB includes more than one Sounding Reference Signals (SRSs), multiplying transmission powers of all the SRSs by the same power reduction coefficient to reduce the transmission powers of all the SRSs with an equal proportion, until that the transmission power of the uplink signal in the CC group does not exceed the maximum transmission power configured for the CC group by the eNB.

2. The method according to claim 1, wherein the step of performing, by a UE, CC grouping on configured uplink CCs comprises: performing, by the UE, CC grouping according to a specified signaling or performing CC grouping according to a pre-defined CC grouping method.

3. The method according to claim 2, wherein the step of performing CC grouping according to a pre-defined CC grouping method comprises:
classifying CCs in a successive frequency band into one CC group; or classifying CCs using the same Power Amplifier (PA) into one CC group; or classifying, CCs with a frequency difference between their used frequency points smaller than a frequency difference threshold pre-defined between a base station and the UE, into one CC group.

4. The method according to claim 1, wherein a condition that the comparison result meets the intra-group power reduction condition comprises: the transmission powers of one or more uplink signals in the CC group exceeding the maximum transmission power configured for the CC group by the eNB.

5. The method according to claim 1, wherein the comparison result meeting the inter-group power reduction condition comprises: the sum of the transmission powers of the uplink signals in all the CC groups exceeding the maximum transmission power configured for the UE by the eNB.

6. The method according to claim 5, wherein the performing a power reduction between the CC groups comprises at least one of followings:
(1) after performing the power reduction within the CC group, reducing sequentially the transmission power of an uplink signal in the reduced CC group, until that the sum of the transmission powers of the uplink signals in all the CC groups does not exceed the maximum transmission power configured for the UE by the eNB;
(2) after performing the power reduction within the CC group, reducing the transmission power of an uplink signal in a non-reduced CC group, until that the sum of the transmission powers of the uplink signals in all the CC groups does not exceed the maximum transmission power configured for the UE by the eNB;
(3) setting priorities between the CC groups, reducing the transmission powers of uplink signals in the CC groups in order of priority, until that the sum of the transmission powers of the uplink signals in all the CC groups does not exceed the maximum transmission power configured for the UE by the eNB; and
(4) setting priority groups between the CC groups, reducing the transmission powers of uplink signals in the CC groups in order of priority group, until that the sum of the transmission powers of the uplink signals in all the CC groups does not exceed the maximum transmission power configured for the UE by the eNB.

7. The method according to claim 6, wherein in the ways of power reduction between the CC groups, the transmission powers of one or more CC groups are reduced.

8. A method for reducing the transmission power of an uplink signal, comprising:
   performing, by a UE, CC grouping on configured uplink CCs; and
   comparing the sum of transmission powers of uplink signals in all CC groups with a maximum transmission power configured for the UE by an eNB, when the comparison result meets an inter-group power reduction condition, performing a power reduction between the CC groups;
   wherein the comparison result meeting an inter-group power reduction condition comprises: the sum of the transmission powers of the uplink signals in all the CC groups exceeding the maximum transmission power configured for the UE by the eNB; and
   wherein the step of performing a power reduction between the CC groups comprises at least one of:
   (1) after performing the power reduction within the CC group, reducing sequentially the transmission power of an uplink signal in the reduced CC group, until that the sum of the transmission powers of the uplink signals in all the CC groups does not exceed the maximum transmission power configured for the UE by the eNB;
   (2) after performing the power reduction within the CC group, reducing the transmission power of an uplink signal in a non-reduced CC group, until that the sum of the transmission powers of the uplink signals in all the CC groups does not exceed the maximum transmission power configured for the UE by the eNB;
   (3) setting priorities between the CC groups, reducing the transmission powers of uplink signals in the CC groups in order of priority, until that the sum of the transmission powers of the uplink signals in all the CC groups does not exceed the maximum transmission power configured for the UE by the eNB; and
   (4) setting priority groups between the CC groups, reducing the transmission powers of uplink signals in the CC groups in order of priority group, until that the sum of the transmission powers of the uplink signals in all the CC groups does not exceed the maximum transmission power configured for the UE by the eNB.

9. The method according to claim 8, wherein in the ways of power reduction between the CC groups, the transmission powers of one or more CC groups are reduced.

10. A device for reducing the transmission power of a uplink signal, comprising a CC grouping module, a reduction determination module and a reduction module, wherein
   the CC grouping module is configured to perform CC grouping on uplink CCs configured by a UE;
   the reduction determination module is configured to compare the transmission power of an uplink signal in each CC group with a maximum transmission power configured for the each CC group by an eNB, and to notify the reduction module when the comparison result meets an intra-group power reduction condition; and/or compare the sum of transmission powers of uplink signals in all CC groups with a maximum transmission power configured for the UE by the eNB, and to notify the reduction module when the comparison result meets an inter-group power reduction condition;
   the reduction module is configured to perform power reduction within the CC group when the comparison result meets the intra-group power reduction condition, and/or perform power reduction using CC group as the unit between the CC groups when the comparison result meets the inter-group power reduction condition;
   wherein the reduction module performing power reduction within the CC group comprises at least one of:
   when an uplink signal in a CC group exceeding a maximum transmission power configured for the CC group by an eNB includes both PUSCHs and PUCCHs, ensuring preferentially the transmission powers of the PUCCHs by the reduction module, and multiplying transmission powers of all PUSCHs by the same power reduction coefficient to reduce the transmission powers of all the PUSCHs with an equal proportion, until that the transmission power of the uplink signal in the CC group does not exceed the maximum transmission power configured for the CC group by the eNB;
   when the uplink signal in the CC group exceeding the maximum transmission power configured for the CC group by the eNB includes both PUSCHs and PUCCHs, and a part of the PUSCHs carry UCI, while other PUSCHs carry only user data, multiplying, by the reduction module, transmission powers of all the PUSCHs carrying only user data by a same power reduction coefficient to reduce the transmission powers of all the PUSCHs carrying only user data with an equal proportion, until that the transmission power of the uplink signal in the CC group does not exceed the maximum transmission power configured for the CC group by the eNB;
   when the uplink signal in the CC group exceeding the maximum transmission power configured for the CC group by the eNB includes more than one PUSCHs, and a part of the PUSCHs carry UCI, while other PUSCHs carry only user data, multiplying, by the reduction module, transmission powers of all the PUSCHs carrying only user data by the same power reduction coefficient to reduce the transmission powers of all the PUSCHs carrying only user data with an equal proportion, until that the transmission power of the uplink signal in the CC group does not exceed the maximum transmission power configured for the CC group by the eNB;
   when the uplink signal in the CC group exceeding the maximum transmission power configured for the CC group by the eNB includes more than one PUSCHs carrying only user data, multiplying, by the reduction module, transmission powers of all the PUSCHs by the same power reduction coefficient to reduce the transmission powers of all the PUSCHs with an equal proportion, until that the transmission power of the uplink signal in the CC group does not exceed the maximum transmission power configured for the CC group by the eNB; and
   when the uplink signal in the CC group exceeding the maximum transmission power configured for the CC group by the eNB includes more than one SRSs, multiplying transmission powers of all the SRSs by the same power reduction coefficient to reduce the transmission powers of all the SRSs with an equal proportion, until that the transmission power of the uplink signal in the CC group does not exceed the maximum transmission power configured for the CC group by the eNB.

11. The device according to claim 10, wherein the CC grouping module is configured to classify classifyCCs in a successive frequency band into one CC group; or classify, CCs with a frequency difference of frequency points smaller than a frequency difference threshold pre-defined between a base station and the UE, into one CC group.

12. The device according to claim 10, wherein the reduction module performs a power reduction between the CC groups by using one of followings:

(1) after performing the power reduction within the CC group, reducing sequentially the transmission power of an uplink signal in the reduced CC group, until that the sum of the transmission powers of the uplink signals in all the CC groups does not exceed the maximum transmission power configured for the UE by the eNB;

(2) after performing the power reduction within the CC group, reducing the transmission power of an uplink signal in a non-reduced CC group, until that the sum of the transmission powers of the uplink signals in all the CC groups does not exceed the maximum transmission power configured for the UE by the eNB;

(3) setting priorities between the CC groups, performing the reduction on transmission powers of uplink signals between the CC groups in order of priority, until that the sum of the transmission powers of the uplink signals in all the CC groups does not exceed the maximum transmission power configured for the UE by the eNB; and (4) setting priority groups between the CC groups, performing the reduction on transmission powers of uplink signals between the CC groups in order of priority group, until that the sum of the transmission powers of the uplink signals in all the CC groups does not exceed the maximum transmission power configured for the UE by the eNB.

13. A device for reducing the transmission power of a uplink signal, comprising a CC grouping module, a reduction determination module and a reduction module, wherein the CC grouping module is configured to perform CC grouping on uplink CCs configured by a UE;

the reduction determination module is configured to compare the sum of transmission powers of uplink signals in all CC groups with a maximum transmission power configured for the each CC group by an eNB, and to notify the reduction module when the comparison result meets an inter-group power reduction condition, wherein the comparison result meeting an inter-group power reduction condition comprises: the sum of the transmission powers of the uplink signals in all the CC groups exceeding the maximum transmission power configured for the UE by the eNB; and the reduction module is configured to perform power reduction using CC group as the unit between the CC groups when the comparison result meets the inter-group power reduction condition;

wherein the reduction module performs a power reduction between the CC groups by using one of followings:

(1) after performing the power reduction within the CC group, reducing sequentially the transmission power of an uplink signal in the reduced CC group, until that the sum of the transmission powers of the uplink signals in all the CC groups does not exceed the maximum transmission power configured for the UE by the eNB;

(2) after performing the power reduction within the CC group, reducing the transmission power of an uplink signal in a non-reduced CC group, until that the sum of the transmission powers of the uplink signals in all the CC groups does not exceed the maximum transmission power configured for the UE by the eNB;

(3) setting priorities between the CC groups, performing the reduction on transmission powers of uplink signals between the CC groups in order of priority, until that the sum of the transmission powers of the uplink signals in all the CC groups does not exceed the maximum transmission power configured for the UE by the eNB; and (4) setting priority groups between the CC groups, performing the reduction on transmission powers of uplink signals between the CC groups in order of priority group, until that the sum of the transmission powers of the uplink signals in all the CC groups does not exceed the maximum transmission power configured for the UE by the eNB.

* * * * *